(12) United States Patent
Sotiropoulou et al.

(10) Patent No.: US 9,850,805 B2
(45) Date of Patent: *Dec. 26, 2017

(54) PRECHAMBER IGNITION SYSTEM

(71) Applicant: Prometheus Applied Technologies, LLC, Fort Collins, CO (US)

(72) Inventors: Maria-Emmanuella Sotiropoulou, Fort Collins, CO (US); Luigi P. Tozzi, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/929,393

(22) Filed: Nov. 1, 2015

(65) Prior Publication Data

US 2016/0053671 A1   Feb. 25, 2016

Related U.S. Application Data

(63) Continuation-in-part of application No. 14/925,908, filed on Oct. 28, 2015, which is a continuation of application No. 13/997,680, filed as application No. PCT/US2011/002012 on Dec. 30, 2011, now Pat. No. 9,745,892.

(60) Provisional application No. 61/460,337, filed on Dec. 31, 2010.

(51) Int. Cl.
| | |
|---|---|
| *F02B 19/12* | (2006.01) |
| *F02P 13/00* | (2006.01) |
| *F02B 19/08* | (2006.01) |
| *F02B 19/10* | (2006.01) |
| *F02B 19/18* | (2006.01) |

(52) U.S. Cl.
CPC .............. *F02B 19/12* (2013.01); *F02B 19/08* (2013.01); *F02B 19/1014* (2013.01); *F02B 19/18* (2013.01); *F02P 13/00* (2013.01); *Y02T 10/125* (2013.01)

(58) Field of Classification Search
CPC ............ F02B 19/12; F02B 19/18; F02P 13/00
USPC .................................. 123/260, 266, 169 EL
See application file for complete search history.

(56) References Cited

U.S. PATENT DOCUMENTS

| | | | |
|---|---|---|---|
| 4,188,932 A | 2/1980 | Konishi et al. | |
| 4,416,228 A * | 11/1983 | Benedikt ............ | F02B 19/1009 123/169 EL |

FOREIGN PATENT DOCUMENTS

| | | | |
|---|---|---|---|
| GB | 2047802 A | 12/1980 | |
| JP | S5422605 U | 2/1979 | |
| JP | S5669416 A | 6/1981 | |
| JP | 2006144648 A | 6/2006 | |
| JP | 2007198244 A | 8/2007 | |
| JP | 2009270540 A | 11/2009 | |

(Continued)

OTHER PUBLICATIONS

European Search Report of European Application No. 11853843 dated Sep. 21, 2015. 8 Pages.

*Primary Examiner* — Mahmoud Gimie
(74) *Attorney, Agent, or Firm* — Barcelo, Harrison & Walker, LLP

(57) ABSTRACT

Generally, embodiments of a pre-chamber unit having a pre-combustion chamber including one or more induction ports in a configuration which achieves flow fields and flow field forces inside the pre-combustion chamber which act to direct flame growth away quenching surface of the pre-combustion chamber.

43 Claims, 32 Drawing Sheets

(56) References Cited

FOREIGN PATENT DOCUMENTS

WO 2003044349 A1 5/2003

\* cited by examiner

PRECHAMBER IGNITION SYSTEM

This application is a continuation-in-part of U.S. patent application Ser. No. 14/925,908 entitled "Prechamber Ignition System," and filed Oct. 28, 2015; which is a continuation of U.S. patent application Ser. No. 13/997,680 entitled "Prechamber Ignition System," and filed Dec. 24, 2013 and published as United States Patent Application Number 2014-0102404 A1; which is the national stage for International Patent Cooperation Treaty Application PCT/2011/002012, filed Dec. 30, 2011, which claims the benefit of U.S. Provisional Patent Application No. 61/460,337, filed Dec. 31, 2010, entitled "High efficiency ricochet effect passive chamber spark plug". The entirety of each of the foregoing patent applications and patent application publications is incorporated by reference herein.

I. TECHNICAL FIELD

Generally, embodiments of a pre-chamber unit having a pre-combustion chamber including one or more induction ports in a configuration which achieves flow fields and flow field forces inside the pre-combustion chamber which direct flame growth away from quenching surfaces of the pre-combustion chamber.

Specifically, embodiments of a pre-combustion chamber having an internal surface and one or more induction ports in a configuration which directs the fuel-oxidizer mixture of in-filling streams to ricochet from one or more locations on the internal surface of the pre-combustion chamber to achieve a flow field and flow field forces inside of the pre-combustion chamber which direct flame growth away from flame quenching surfaces of the pre-combustion chamber.

II. BACKGROUND

Engines operating on gaseous fuels, such as natural gas, may be supplied with a lean fuel mixture having a relatively high ratio of oxidizer to fuel. Conventional pre-chamber spark plugs may be used to enhance the lean flammability limits in lean burn engines. As one example, U.S. Pat. No. 7,922,551 describes a pre-chamber spark plug which reduces electrode erosion by spreading the discharge energy over a wider surface area via a swirling effect created by periphery holes in an end cap. However, in general there remain a number of unresolved disadvantages with the use of conventional pre-chamber spark plugs in lean burn engines and specifically as described in U.S. Pat. No. 7,922,551, as follow.

A first substantial disadvantage with conventional pre-chamber spark plugs may be that the configuration of the pre-combustion chamber does not adequately concentrate fuel at the spark gap region of the spark plug. One aspect of this disadvantage can be that the flow field forces within the spark gap region may be disorganized or even result in dead zones in which there is very little or no flow field. This can result in flame kernel quenching as there are no flow field forces to move the flame kernel away from the quenching surfaces.

A second substantial disadvantage with conventional pre-chamber spark plugs may be that the configuration of the pre-chamber promotes flame kernel development in proximity to flame quenching surfaces or promotes flame growth toward flame quenching surfaces.

A third substantial disadvantage with conventional pre-chamber spark plugs may be that the configuration of the pre-chamber may not mix in-filling streams with residual gases to sufficiently lower the temperature inside of the pre-chamber or the internal surface of the pre-chamber which may result in auto-ignition of the fuel-oxidizer mixture.

A fourth substantial disadvantage with conventional pre-chamber spark plugs may be that the configuration of the pre-chamber may not result in sufficiently fast burn rates with lean fuel mixtures resulting in deployment of flame jets into the main combustion chamber which by comparison with faster burn rates have lesser momentum.

These and other unresolved disadvantages with conventional pre-chamber spark plugs which can result in one or more slow and unstable combustion of fuel-oxidizer mixtures, flame quenching, auto-ignition, and decreased momentum of flame jets are addressed by the instant invention.

III. DISCLOSURE OF INVENTION

Accordingly, a broad object of the invention can be to provide embodiments of the pre-combustion chamber of pre-combustion chamber units having configurations which generate flow fields and flow field forces inside the pre-combustion chamber which can achieve in comparison to conventional pre-chamber spark plugs one or more of: increased fuel-oxidizer mixture ratio in the electrode gap region, a flow field within the electrode gap which reduces flow of fuel-oxidizer mixtures toward flame quenching surfaces or creates a flow of fuel-oxidizer mixture directed or moving away from flame quenching surfaces, increases fuel-oxidizer mixture ratio in the central region of the pre-combustion chamber, directs or moves flame growth away from flame quenching surfaces, directs or moves flame growth toward the central region of the pre-combustion chamber, directs or moves flame growth toward the region of the pre-combustion chamber having increased fuel-oxidizer mixture ratio, increases mixing of in-filling streams with the residual combustion gases, increases burn rates of fuel-oxidizer mixtures, and generates increased momentum of flame jets.

Another broad object of the invention can be to provide embodiments of the pre-combustion chamber of pre-combustion chamber units having configurations which generate flow fields and flow field forces inside the pre-combustion chamber which can achieve one or more of: a first recirculation zone associated with the electrode gap having sufficient flow field forces upon ignition of the fuel-oxidizer mixture inside the pre-combustion chamber to move the flame kernel away from flame quenching surfaces of the pre-combustion chamber or reduces movement of the flame kernel toward quenching surfaces of the pre-combustion chamber, a second recirculation zone having an increased fuel-oxidizer mixture ratio (increased mass of fuel per unit volume or increased fuel concentration) approaching the center of the pre-combustion chamber, and a third recirculation zone having increased mixing of residual gases with in-filling streams.

Another broad object of the invention can be to provide embodiments of a pre-chamber spark plug which include a pre-combustion chamber having configurations which generate the inventive flow fields and inventive flow field forces inside the pre-combustion chamber which can achieve one or more of: a first recirculation zone associated with the electrode gap having sufficient flow field forces upon ignition of the fuel-oxidizer mixture inside the pre-combustion chamber to move the flame kernel away from flame quenching surfaces of the pre-combustion chamber or reduces movement of the flame kernel toward quenching surfaces of the pre-combustion chamber, a second recirculation zone having an increased fuel-oxidizer mixture ratio (increased mass of fuel per unit volume or increased fuel concentration) approaching the center of the pre-combustion chamber, and a third recirculation zone having increased mixing of residual gases with in-filling streams.

Another broad object of the invention can be to provide a method of making or using pre-combustion chamber units which achieves one or more of the above-described inventive recirculation zones, flow fields, or flow field forces among a plurality of different configurations of pre-combustion chamber units to provide one or more of the advantages of: increased fuel-oxidizer mixture ratio in the electrode gap region, a flow field within the electrode gap which reduces flow of fuel-oxidizer mixtures toward flame quenching surfaces or creates a flow of fuel-oxidizer mixture directed or moving away from flame quenching surfaces, increases the fuel-oxidizer mixture ratio in the central region of the pre-combustion chamber, directs or moves flame growth away from flame quenching surfaces, directs or moves flame growth toward the central region of the pre-combustion chamber, directs or moves flame growth toward the region of the pre-combustion chamber having increased fuel-oxidizer mixture ratio, increases mixing of in-filling streams with the residual combustion gases, increases burn rates of fuel-oxidizer mixtures inside the pre-combustion chamber, and generates increased momentum of flame jets deployed to the main combustion chamber of an engine.

Naturally, further objects of the invention are disclosed throughout other areas of the specification, drawings, and claims.

IV. BRIEF DESCRIPTION OF THE DRAWINGS

Figure 18:
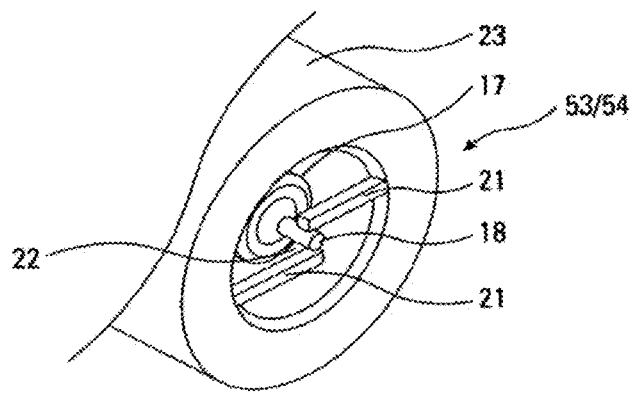
FIG. 18 is an enlarged end view which shows a first electrode in the form of a central electrode and a second electrode in the form of a dual bar structure.
Figure 25:
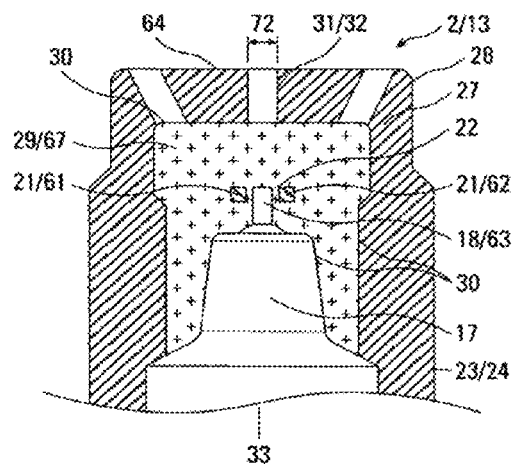
Figure 28:
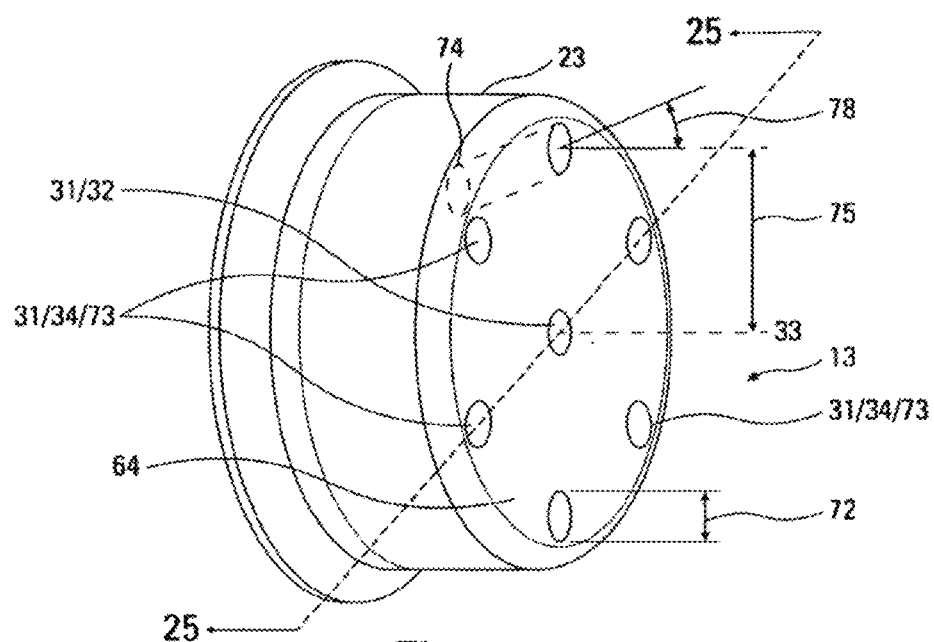

FIG. 25 is an enlarged cross-section view 25-25 as shown in FIG. 28 of a particular embodiment of an inventive pre-combustion chamber of a pre-combustion chamber structure which encloses a pre-combustion chamber volume including a first pre-combustion chamber volume and a second pre-combustion chamber volume with a first electrode in the form of a central electrode and a second electrode in the form of a dual bar as shown in FIG. 18.

Figure 26:
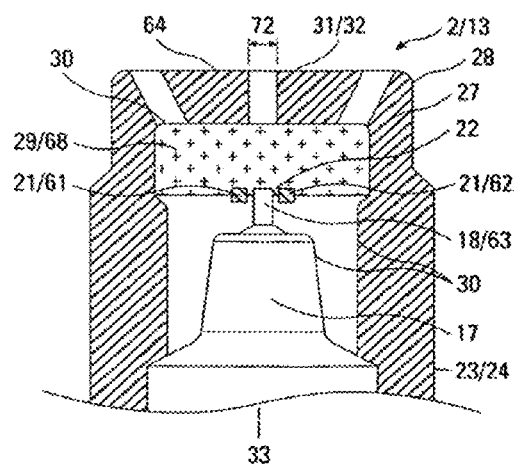

FIG. 26 is an enlarged cross-section view 25-25 as shown in FIG. 28 of a particular embodiment of an inventive pre-combustion chamber structure which illustrates the first pre-chamber volume.

Figure 27:
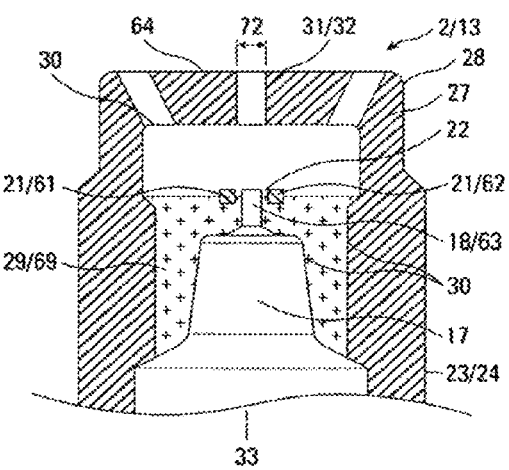

FIG. 27 is an enlarged cross-section view 25-25 as shown in FIG. 28 of a particular embodiment of an inventive pre-combustion chamber of a pre-combustion chamber structure which illustrates the second pre-chamber volume.

FIG. 28 is a perspective view of a particular embodiment of an inventive a pre-combustion chamber structure which illustrates certain dimensional relationships.

Figure 29:
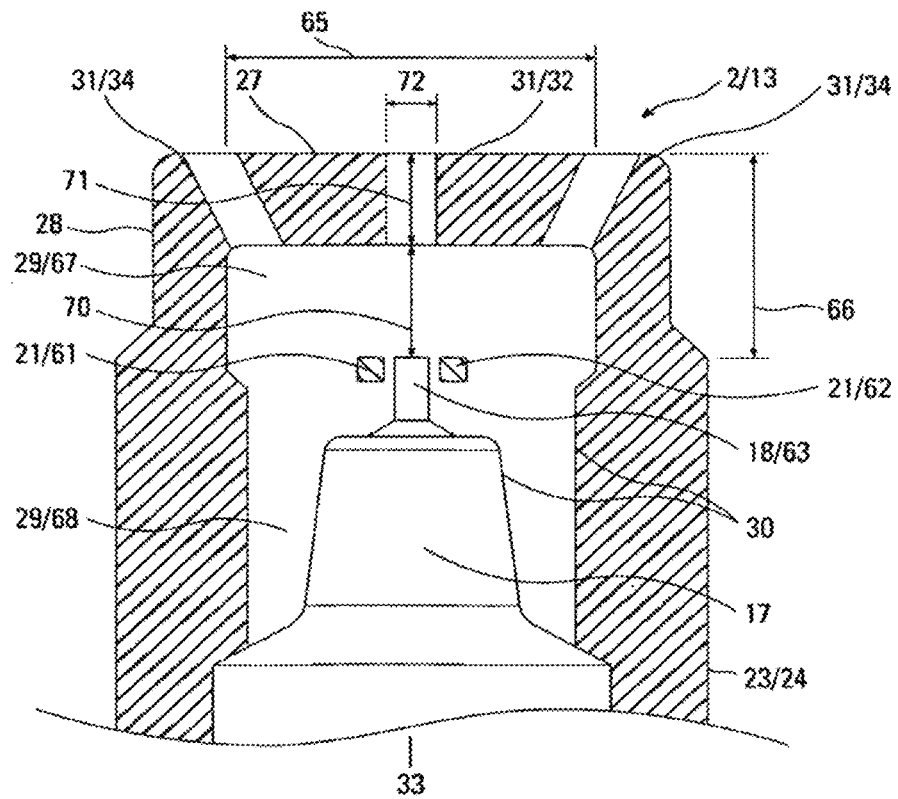

FIG. 29 is an enlarged cross-section view 25-25 as shown in FIG. 28 which illustrates certain dimensional relationships of a particular embodiment of an inventive pre-combustion chamber structure.

Figure 19:
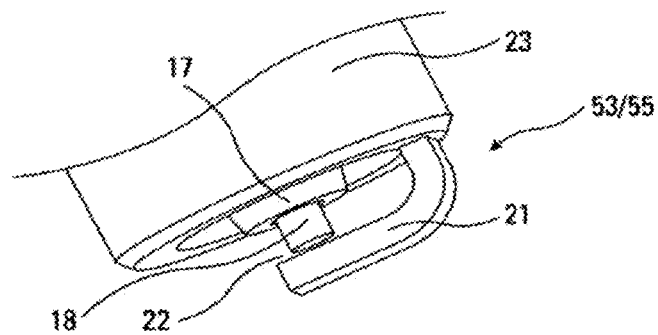
FIG. 19 is an enlarged end view which shows a first electrode in the form of a central electrode and a second electrode in the form of a J-gap.
Figure 30:
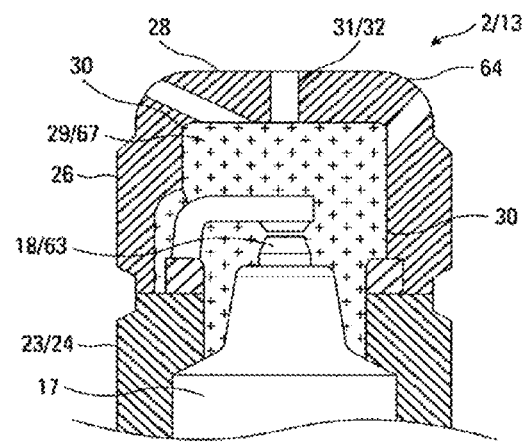
Figure 33:
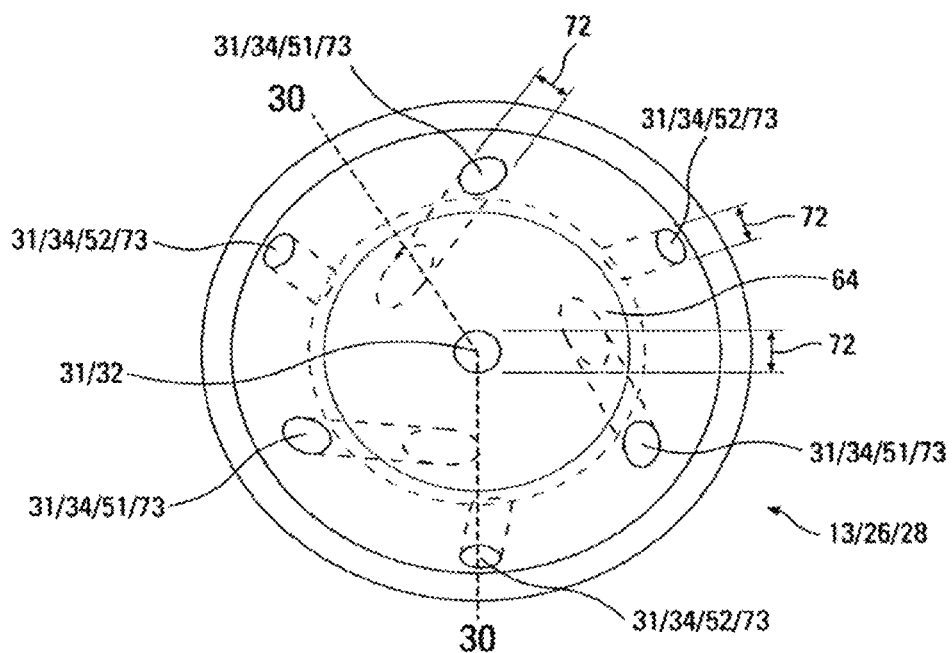

FIG. 30 is an enlarged cross-section view 30-30 as shown in FIG. 33 of a particular embodiment of an inventive pre-combustion chamber of a pre-combustion chamber structure which encloses a pre-combustion chamber volume including a first pre-combustion chamber volume and a second pre-combustion chamber volume with a first electrode in the form of a central electrode and a second electrode in the form of a J-gap as shown in FIG. 19.

Figure 31:
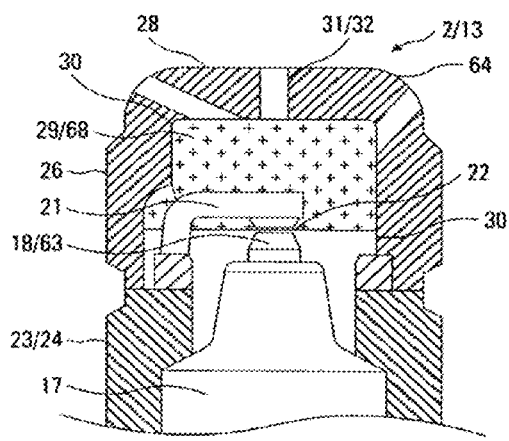

FIG. 31 is an enlarged cross-section view 30-30 as shown in FIG. 33 of a particular embodiment of an inventive pre-combustion chamber structure which illustrates the first pre-chamber volume.

Figure 32:
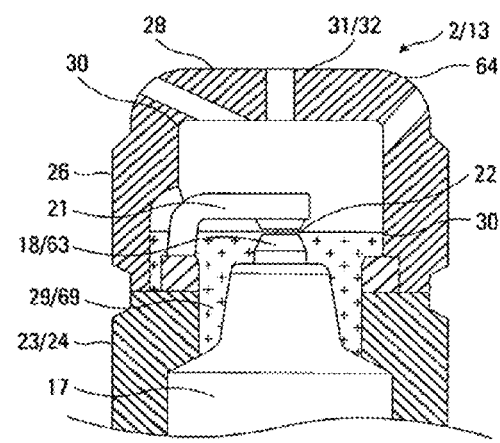

FIG. 32 is an enlarged cross-section view 30-30 as shown in FIG. 33 of a particular embodiment of an inventive pre-combustion chamber of a pre-combustion chamber structure which illustrates the second pre-chamber volume.

FIG. 33 is a top view of a particular embodiment of an inventive a pre-combustion chamber structure which illustrates certain dimensional relationships.

Figure 34:
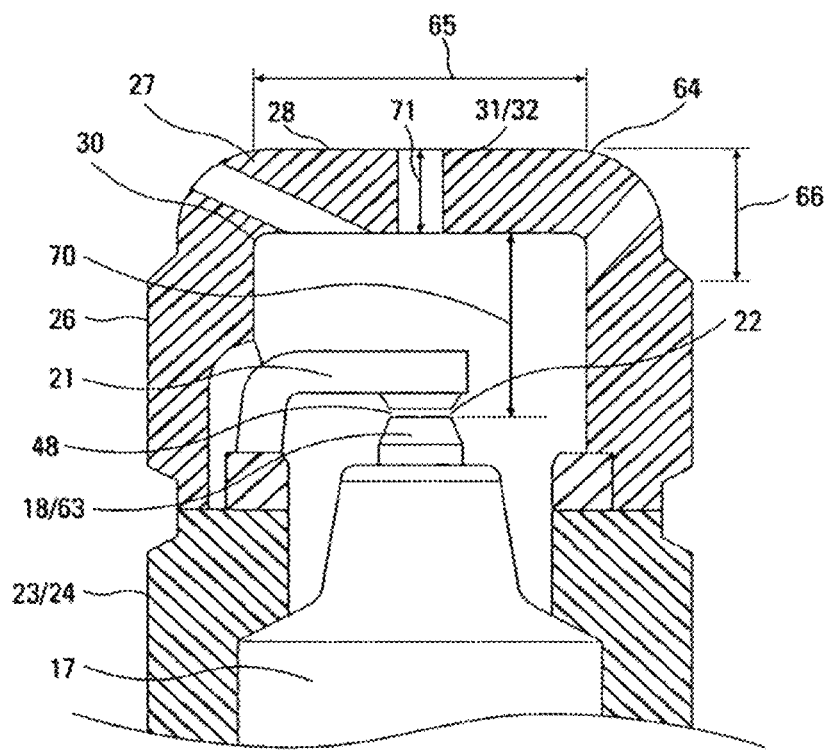

FIG. 34 is an enlarged cross section view 30-30 as shown in FIG. 33 which illustrates the dimensional relationships of a particular embodiment of an inventive pre-combustion chamber structure.

Figure 35:
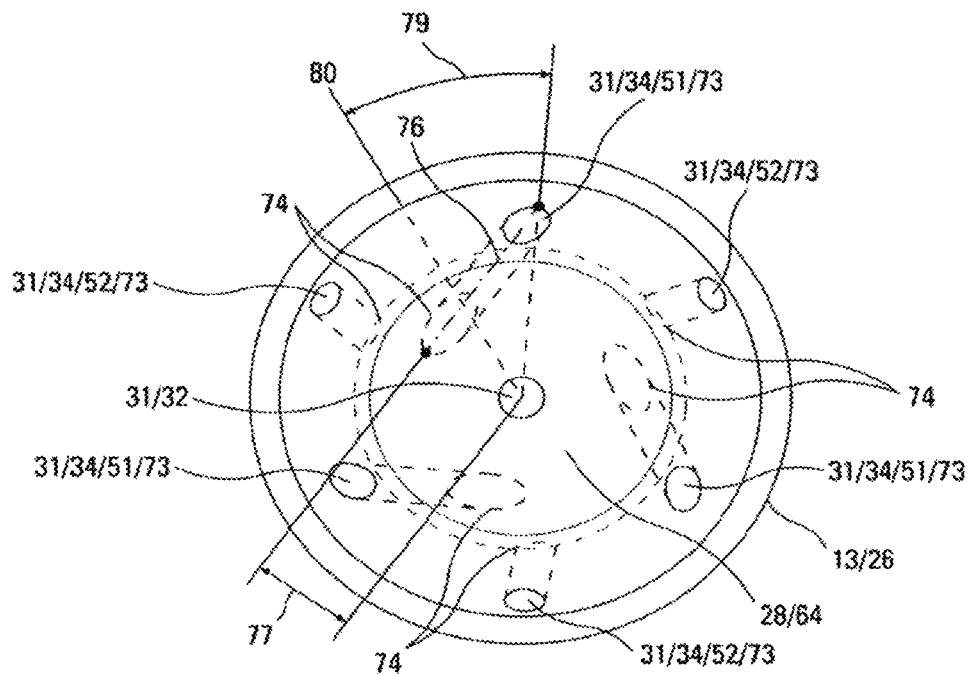

FIG. 35 is a top view of a particular embodiment of an inventive a pre-combustion chamber structure which illustrates certain dimensional relationships.

Figure 36:
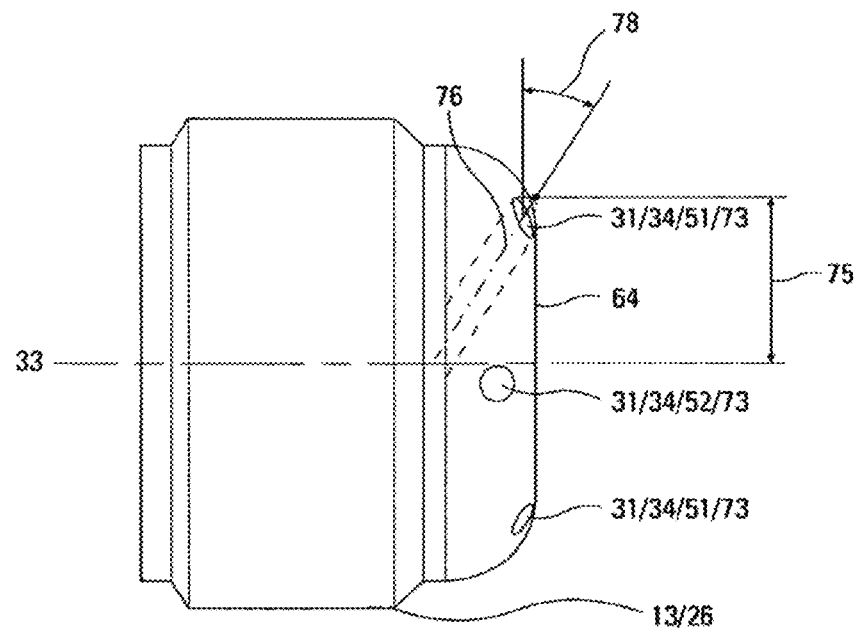

FIG. 36 is a side view of a particular embodiment of an inventive a pre-combustion chamber structure which illustrates certain dimensional relationships.

Figure 37:
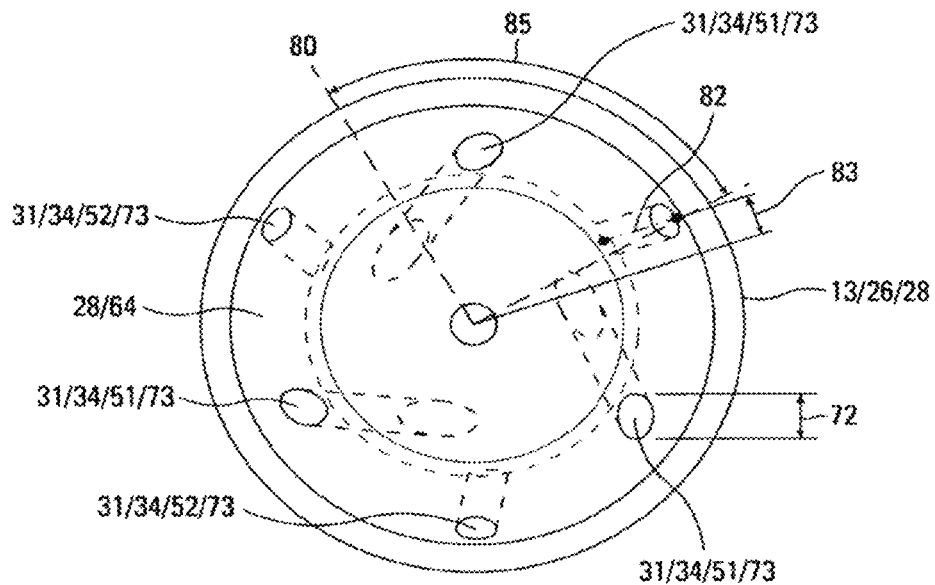

FIG. 37 is a top view of a particular embodiment of an inventive a pre-combustion chamber structure which illustrates certain dimensional relationships.

Figure 38:
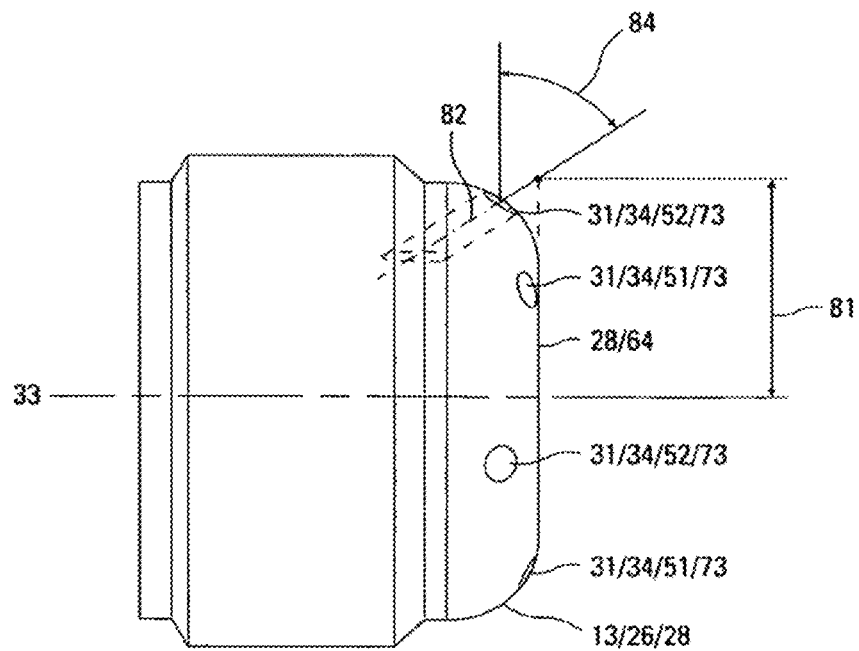

FIG. 38 is a side view of a particular embodiment of an inventive a pre-combustion chamber structure which illustrates certain dimensional relationships.

Figure 39:
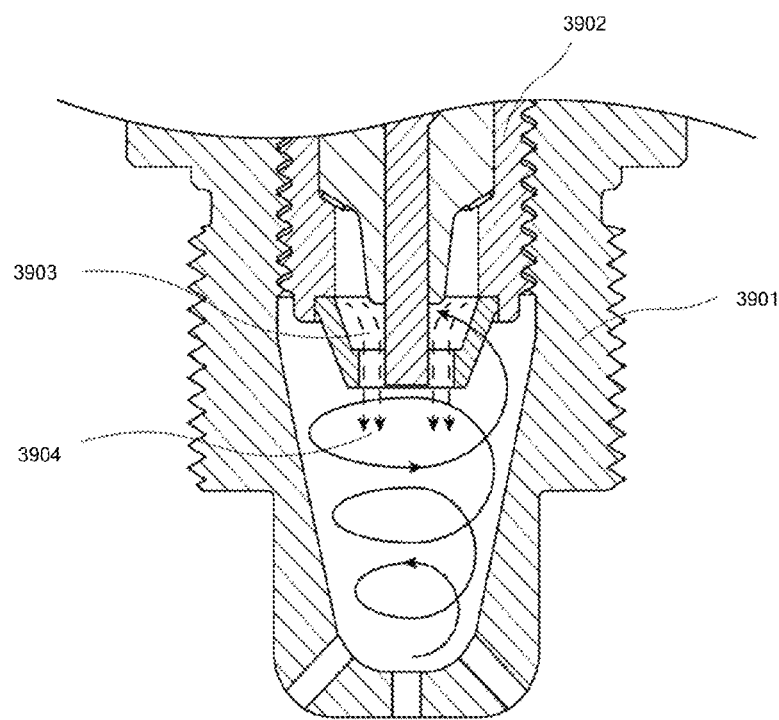

FIG. 39 depicts uniform flow velocity and magnitude in the gap of a permanent passive prechamber with a removable spark plug in accordance with certain embodiments.

Figure 40:
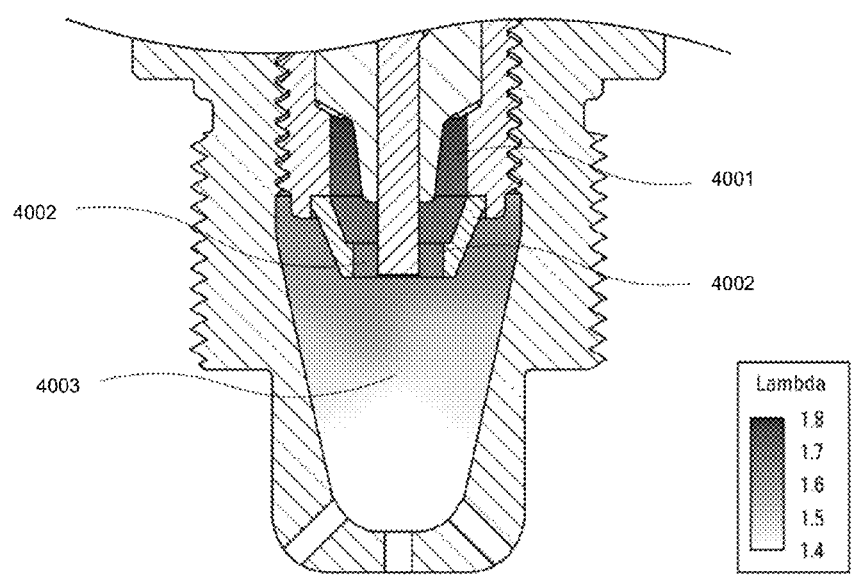

FIG. 40 depicts uniform Lambda distribution in the gap of a permanent passive prechamber with a removable spark plug in accordance with certain embodiments.

Figure 41:
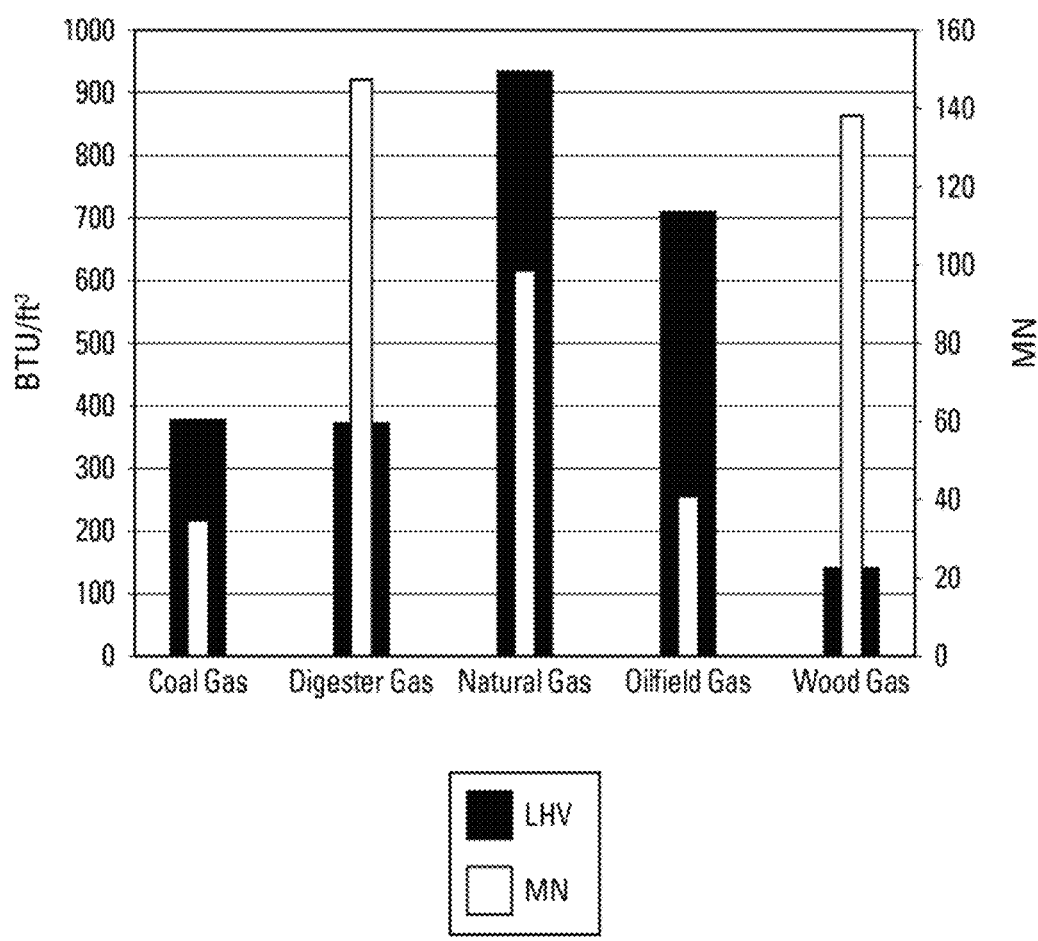

FIG. 41 depicts a correlation between the type of fuel, the Low Heating Value (LHV) and the fuel Methane Number (MN) in accordance with certain embodiments.

Figure 42:
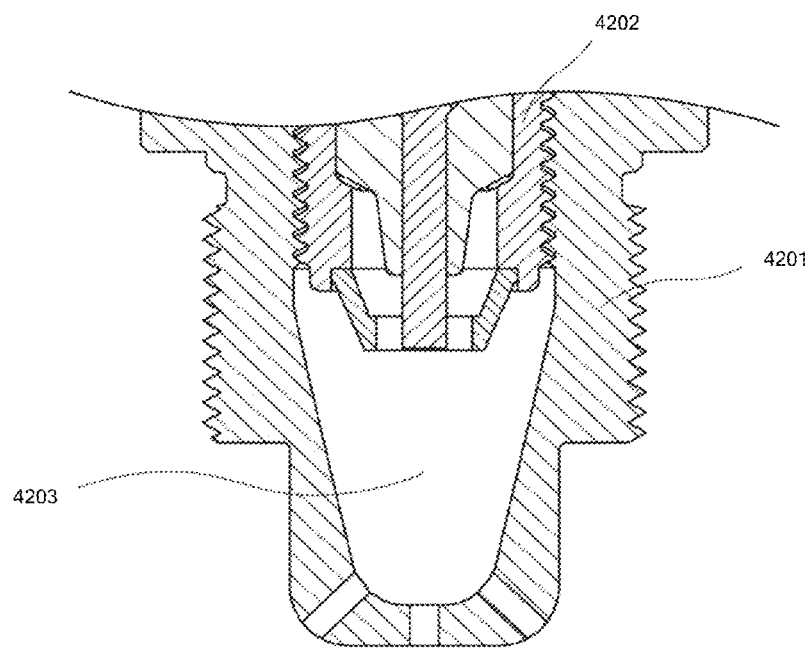

FIG. 42 depicts a permanent passive prechamber with removable spark plug for natural gas fueled engines in accordance with certain embodiments.

Figure 43:
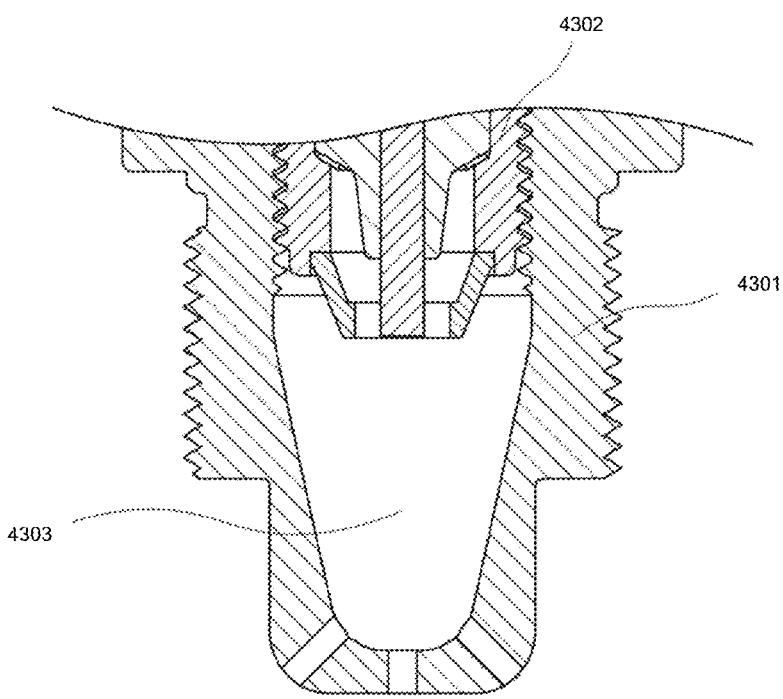

FIG. 43 depicts a permanent passive prechamber with removable spark plug for low BTU fueled engines in accordance with certain embodiments.

Figure 44:
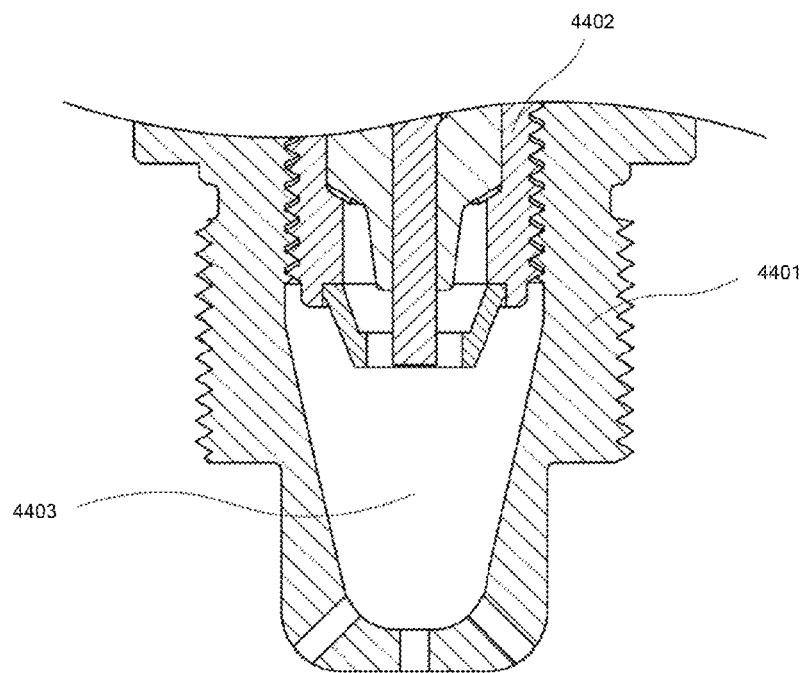

FIG. 44 depicts a permanent passive prechamber with removable spark plug for greater than about 60 MN fueled engines in accordance with certain embodiments.

Figure 45:
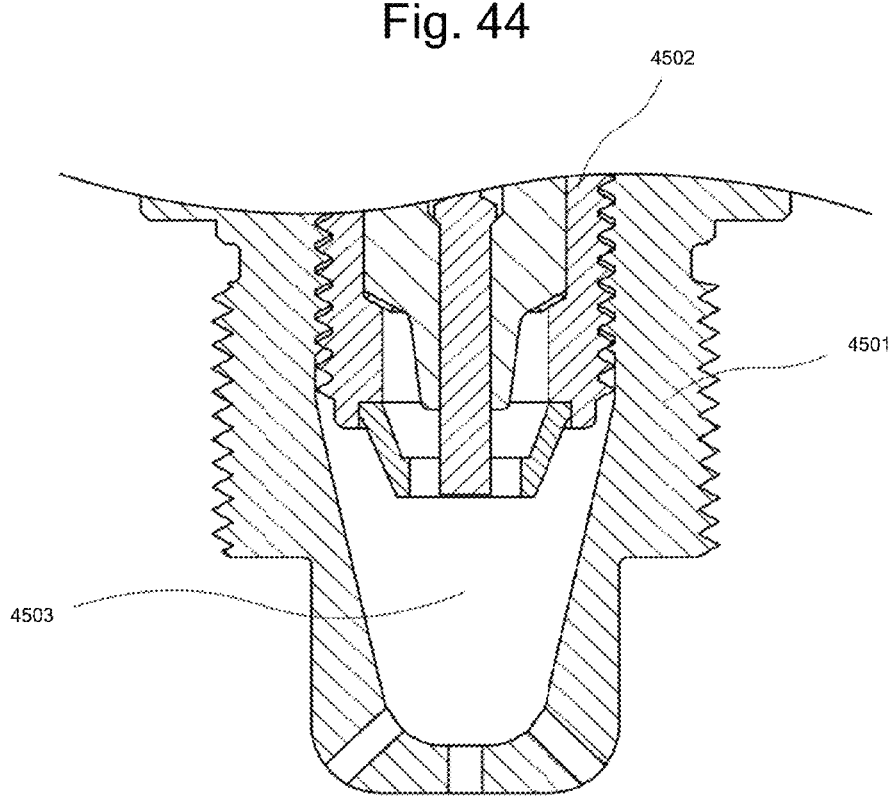

FIG. 45 depicts a permanent passive prechamber with removable spark plug for low MN fueled engines in accordance with certain embodiments.

Figure 46:
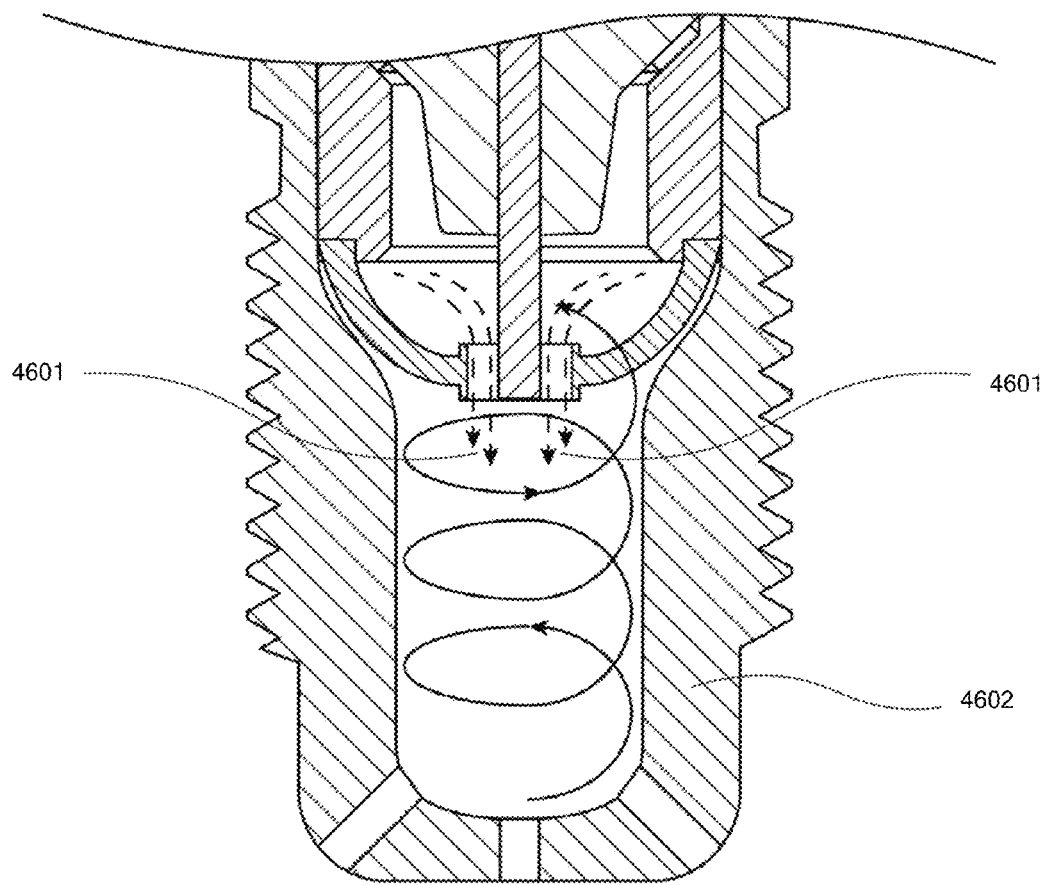

FIG. 46 depicts uniform flow velocity and magnitude in the gap of a forward flow prechamber spark plug in accordance with certain embodiments.

Figure 47:
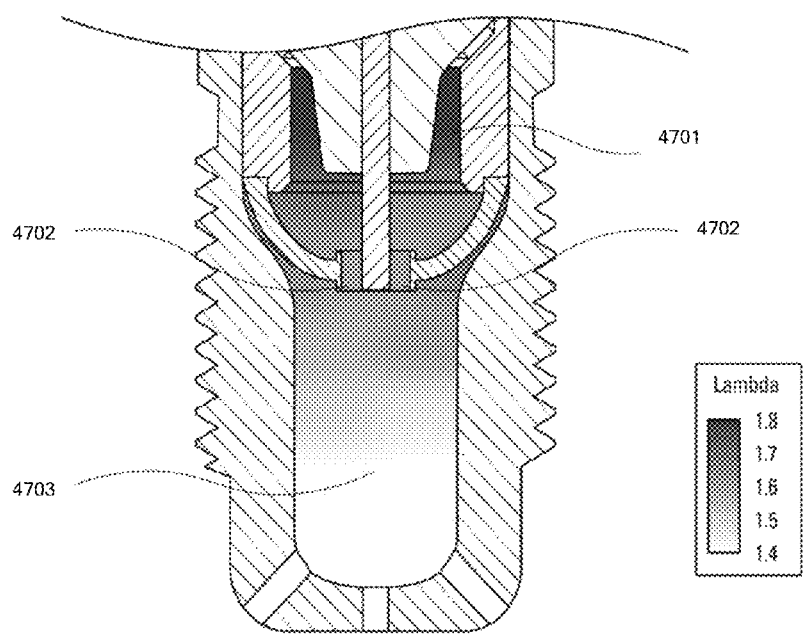

FIG. 47 depicts uniform Lambda distribution in the gap of a forward flow prechamber spark plug in accordance with certain embodiments.

Figure 48:
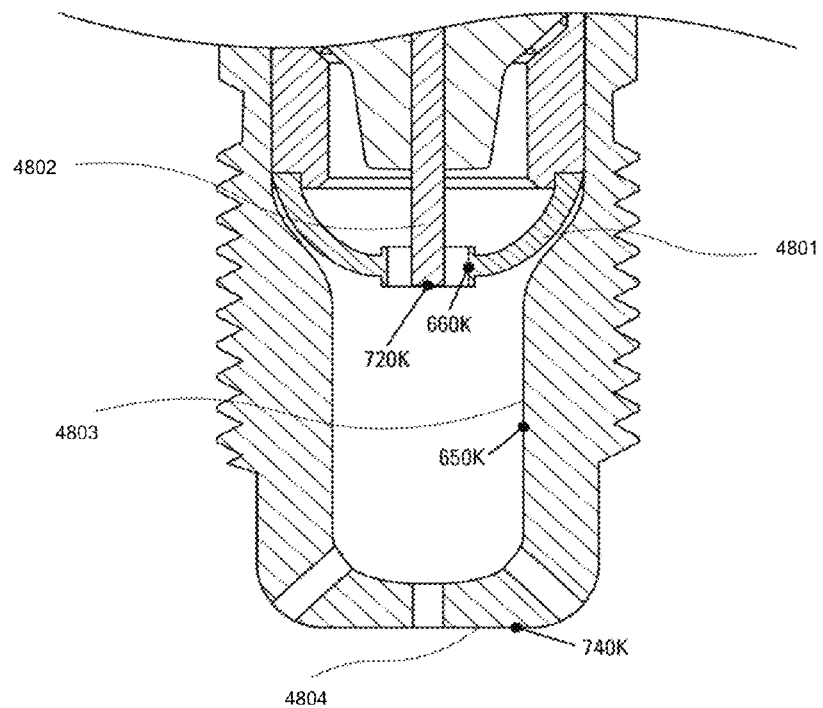

FIG. 48 depicts a temperature distribution in the major elements of a forward flow prechamber spark plug in accordance with certain embodiments.

Figure 49:
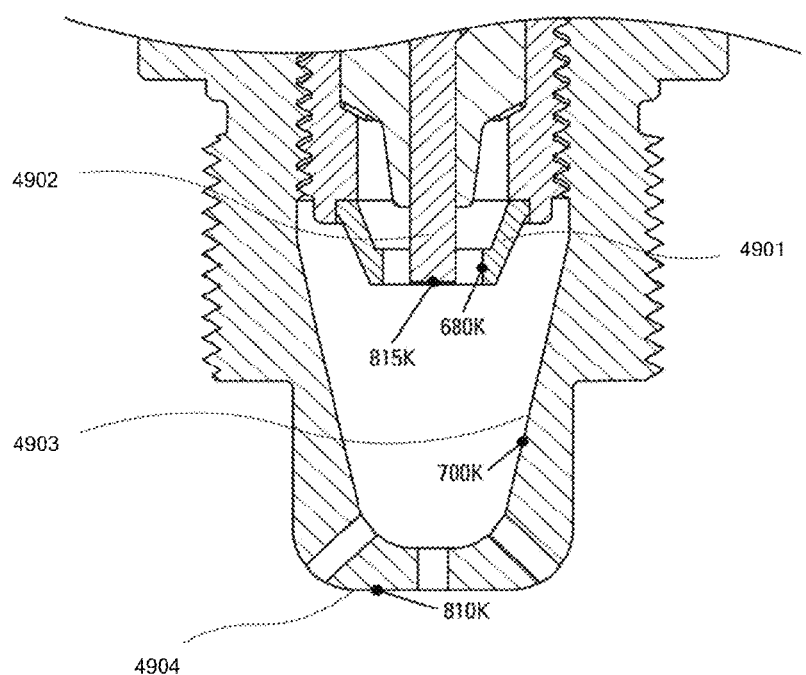

FIG. 49 depicts a temperature distribution in the major elements of a removable spark plug and permanent prechamber in accordance with certain embodiments.

Figure 50:
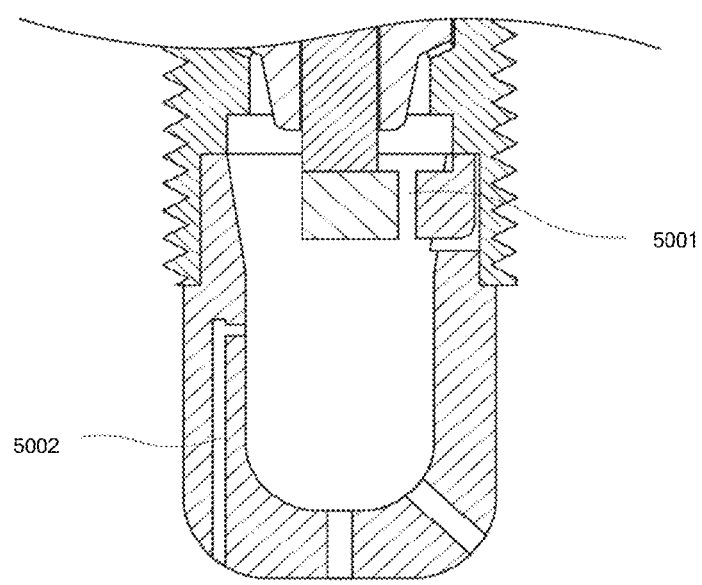

FIG. 50 depicts an active scavenge prechamber spark plug with a scavenging port located remotely from the radial gap in accordance with certain embodiments.

Figure 51:
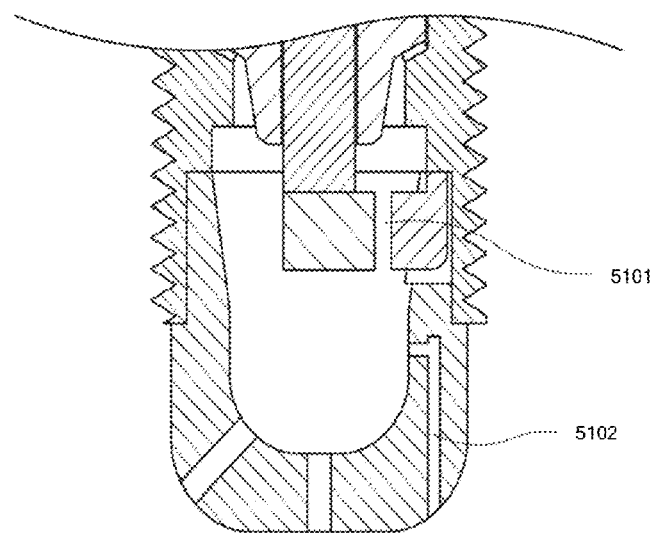

FIG. 51 depicts an active scavenge prechamber spark plug with a scavenging port located adjacent to the radial gap in accordance with certain embodiments.

Figure 52:
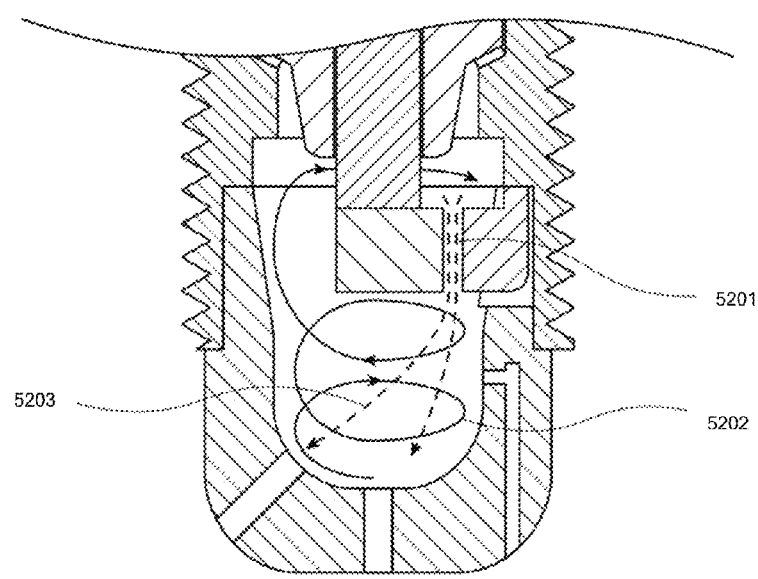

FIG. 52 depicts a flow velocity pattern and uniform magnitude in a single radial gap of an active scavenge prechamber spark plug in accordance with certain embodiments.

Figure 53:
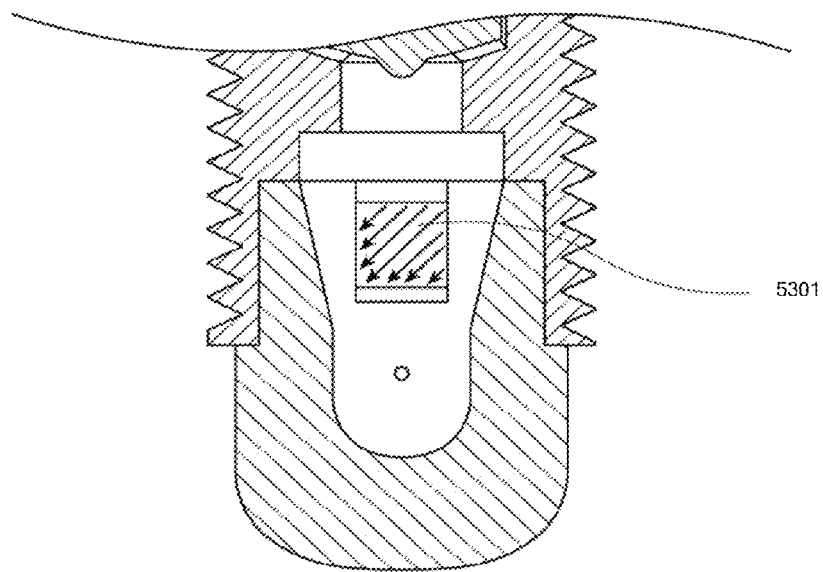

FIG. 53 depicts uniform flow velocity and magnitude (1501) in a single radial gap of an active scavenge prechamber spark plug in accordance with certain embodiments.

Figure 54:
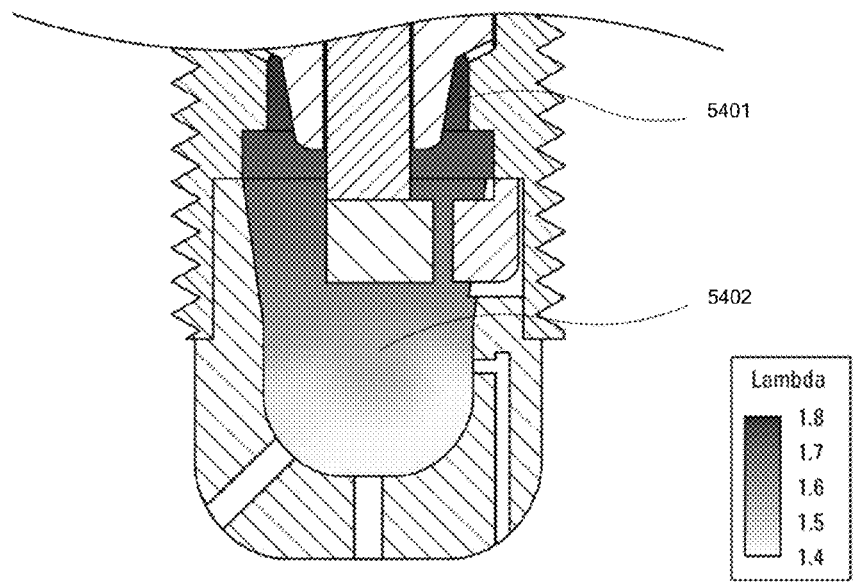

FIG. 54 depicts Lambda stratification in a prechamber in accordance with certain embodiments.

Figure 55:
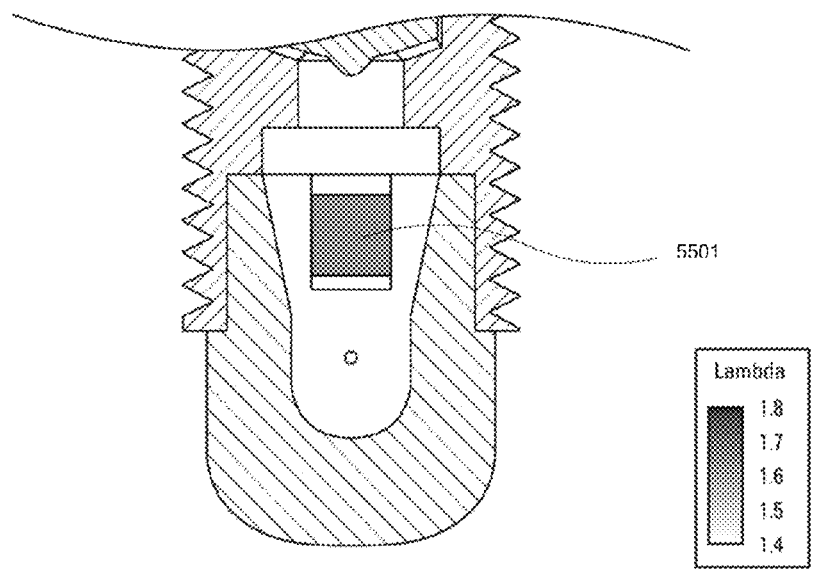

FIG. 55 depicts uniform Lambda distribution in the single radial gap in accordance with certain embodiments.

Figure 56:
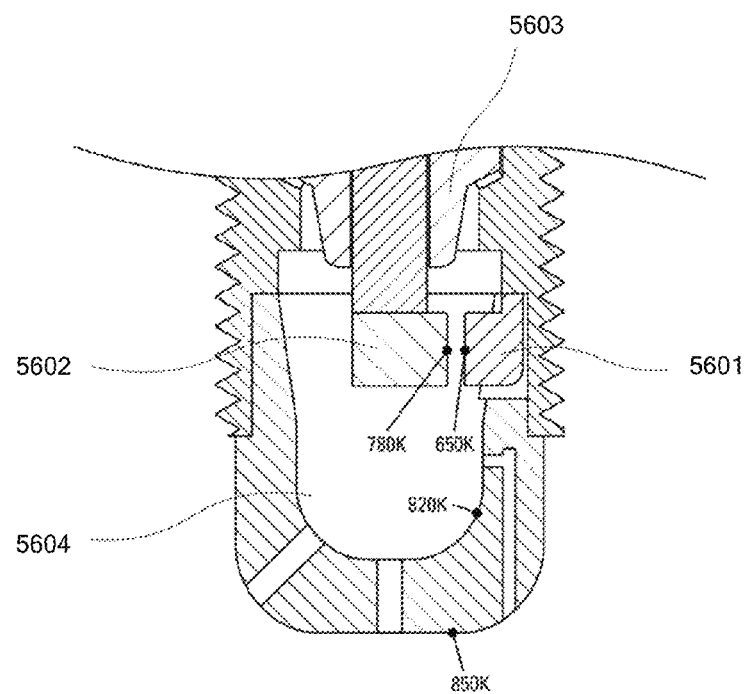

FIG. 56 depicts a temperature distribution in the major elements of an active scavenge prechamber spark plug with single radial gap in accordance with certain embodiments.

Figure 57:
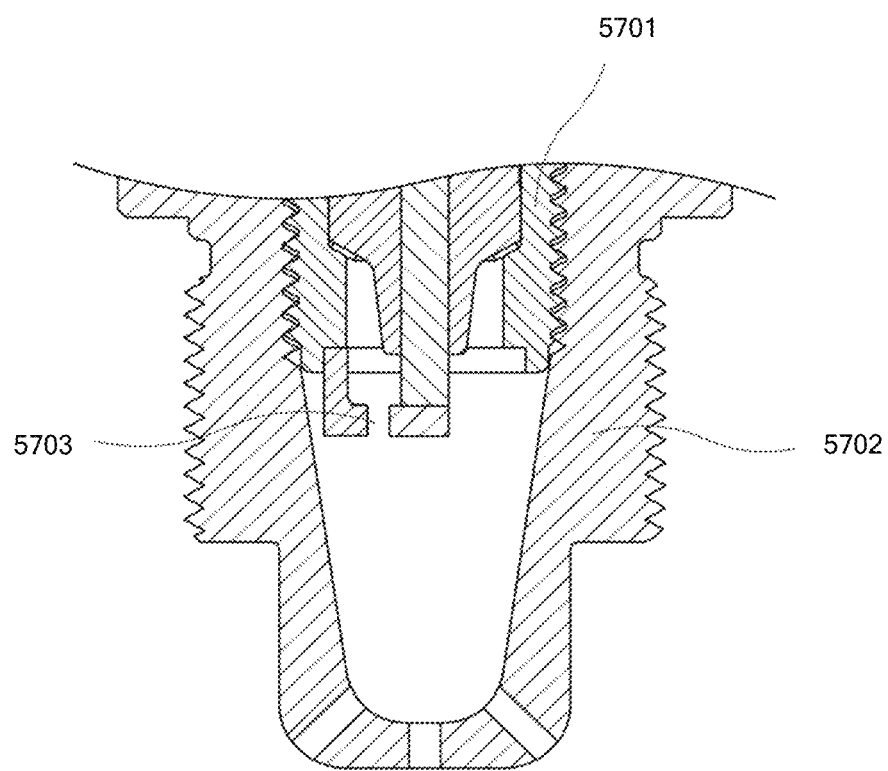

FIG. 57 depicts a removable spark plug with radial gap, screwed into a pre-chamber in accordance with certain embodiments.

V. MODE(S) FOR CARRYING OUT THE INVENTION

In certain embodiments, a method of distributing a fuel-oxidizer mixture in a pre-combustion chamber is described, comprising: providing a pre-combustion chamber comprising at least one induction port that communicates between an external surface and an internal surface of said pre-combustion chamber; providing a spark plug comprising: a primary electrode; one or more ground electrodes offset radially from the primary electrode to form one or more electrode gaps; removably attaching the spark plug to the pre-combustion chamber so that the one or more electrode gaps are disposed within the pre-combustion chamber volume; and directing a fuel-oxidizer mixture into the pre-combustion chamber via the at least one induction port to reduce interaction of a flame kernel with an internal surface of said pre-combustion chamber. The pre-combustion chamber may further comprise a first plurality of threads for removably engaging a second plurality of threads on the spark plug to removably attach the spark plug to the pre-combustion chamber. The pre-combustion chamber may be permanently affixed to an engine cylinder head. The pre-combustion chamber may be configured to generate a flow velocity in the one or more electrode gaps of the spark plug that is substantially uniform in magnitude and direction when a fuel air mixture is ignited in the pre-combustion chamber. The pre-combustion chamber may be configured to direct a flow from the one or more electrode gaps of the spark plug away from quenching surfaces and toward one or more of the one or more holes when a fuel air mixture is ignited in the pre-combustion chamber. The method may further comprise directing a fuel-oxidizer mixture into the pre-combustion chamber via the at least one induction port to reduce flow field velocities approaching said internal surface of said pre-combustion chamber to reduce quenching of flame growth. The method may further comprise directing a fuel-oxidizer mixture into the pre-combustion chamber via the at least one induction port to increase said fuel-oxidizer mixture ratio in said electrode gap. The method may further comprise directing a fuel-oxidizer mixture into the pre-combustion chamber via the at least one induction port to reduce velocity of said flame kernel movement towards said internal surface of said pre-combustion chamber.

In certain embodiments, a method of distributing a fuel-oxidizer mixture in a pre-combustion chamber is disclosed, comprising providing a pre-combustion chamber comprising: at least one induction port which communicates between an external surface and an internal surface of said pre-combustion chamber; the at least one induction port configured to aim at least one infilling stream of said fuel-oxidizer mixture at said internal surface of said pre-combustion chamber; and providing a spark plug comprising: a primary electrode; one or more ground electrodes offset radially from the primary electrode to form one or more electrode gaps; removably attaching the spark plug to the pre-combustion chamber so that the one or more electrode gaps are disposed within the pre-combustion chamber volume; and introducing at least one infilling stream of fuel-oxidizer mixture into the pre-combustion chamber via the at least one induction port. The pre-combustion chamber may further comprise a first plurality of threads for removably engaging a second plurality of threads on the spark plug to removably attach the spark plug to the pre-combustion chamber. The pre-combustion chamber may be permanently affixed to an engine cylinder head. The pre-combustion chamber may be configured to generate a flow velocity in the one or more electrode gaps of the spark plug that is substantially uniform in magnitude and direction when a fuel air mixture is ignited in the pre-combustion chamber. The pre-combustion chamber may be configured to direct a flow from the one or more electrode gaps of the spark plug away from quenching surfaces and toward one or more of the one or more holes when a fuel air mixture is ignited in the pre-combustion chamber. The method may further comprise configuring said at least one induction port to aim at least one infilling stream of said fuel-oxidizer mixture at least one point location on said internal surface of said pre-combustion chamber selected from the group consisting of: a core nose of a central insulator, an upper corner of said core nose of said central insulator, one or more electrodes, and said shell. The method may further comprise ricocheting said at least one infilling stream from said internal surface of said pre-combustion chamber to achieve reduced interaction of said flame kernel with said internal surface of said pre-combustion chamber.

In certain embodiments, a pre-chamber unit is disclosed, comprising: a pre-combustion chamber; and at least one induction port which communicates between an external surface and an internal surface of said pre-combustion chamber, said at least one induction port configured to direct a fuel-oxidizer mixture into the pre-combustion chamber to generate flow field forces within said pre-combustion chamber which upon ignition of a fuel-oxidizer mixture reduce the interaction of a flame kernel with said internal surface of said pre-combustion chamber; wherein the pre-combustion chamber is configured for removably receiving a spark plug comprising a primary electrode and one or more ground electrodes disposed within the pre-combustion chamber volume and offset radially from the primary electrode to form one or more electrode gaps, such that the one or more electrode gaps are disposed within the pre-combustion chamber volume. The one or more ground electrodes may comprise a single ground electrode offset radially from the primary electrode to form a single electrode gap. The pre-combustion chamber may further comprise a first plurality of threads for removably engaging a second plurality of threads on the spark plug to removably attach the spark plug to the pre-combustion chamber. The pre-combustion chamber may be permanently affixed to an engine cylinder head. The pre-combustion chamber may be configured to generate a flow velocity in the one or more electrode gaps of the spark plug that is substantially uniform in magnitude and direction when a fuel air mixture is ignited in the pre-combustion chamber. The pre-combustion chamber may be configured to direct a flow from the one or more electrode gaps of the spark plug away from quenching surfaces and toward one or more of the one or more holes when a fuel air mixture is ignited in the pre-combustion chamber. The at least one induction port may be configured to aim at least one infilling stream toward said internal surface of said pre-combustion chamber to reduce the interaction of said flame kernel with said internal surface of said pre-combustion chamber. The at least one induction port may be configured to aim at least one infilling stream toward a selected one or more of: a nose of a central insulator, an upper corner of a nose of a central insulator, a lower corner of a nose of a central insulator, a side surface of a nose of a central insulator, and a shell. The at least one induction port may be configured to develops flow field forces which increase mixing of an amount of residual gases within said pre-combustion chamber with said in-filling streams to reduce temperature of said internal surface of said pre-chamber or said amount of residual gases.

In certain embodiments, a method of distributing a fuel-oxidizer mixture in a pre-combustion chamber is disclosed, comprising: providing a pre-combustion chamber comprising: a primary electrode and one or more ground electrodes disposed within the pre-combustion chamber, the primary electrode and the ground electrode disposed a distance apart to provide one or more electrode gaps; at least one induction port which communicates between an external surface and an internal surface of said pre-combustion chamber; and directing a fuel-oxidizer mixture into the pre-combustion chamber via the at least one induction port to reduce interaction of a flame kernel with an internal surface of said pre-combustion chamber. The ground electrodes may comprise a single ground electrode disposed a distance apart from the primary electrode to form a single electrode gap. The single ground electrode may have a surface area greater than about 1 mm$^2$ The pre-combustion chamber may be configured to generate a flow velocity in the single electrode gap of the spark plug that is less than about 100 m/s when a fuel air mixture is ignited in the pre-combustion chamber. The pre-combustion chamber may be configured to generate an average turbulent kinetic energy greater than 1 m$^2$/s$^2$ when a fuel air mixture is ignited in the pre-combustion chamber. The pre-combustion chamber may be configured to generate a substantially uniform lambda distribution in the single electrode gap of the spark plug when a fuel air mixture is ignited in the pre-combustion chamber. The pre-combustion chamber may be configured to generate a lambda fuel air mixture richer than about 2.5 in the single electrode gap of the spark plug when a fuel air mixture is ignited in the pre-combustion chamber. The pre-combustion chamber may be configured to generate an average lambda value richer than about 2.5 in the pre-combustion chamber when a fuel air mixture is ignited in the pre-combustion chamber. The volume of the pre-combustion chamber may be between about 1000 mm$^3$ and about 6000 mm$^3$ for use with fuels with energy content greater than about 800 BTU/ft$^3$. The pre-combustion chamber may have a total volume greater than about 1000 mm$^3$ for use with fuels with energy content less than about 800 BTU/ft$^3$. The pre-combustion chamber may have a total volume less than about 6000 mm$^3$ for use with fuels with Methane Number lower than about 60. The pre-combustion chamber may have a total volume between about 1000 mm$^3$ and about 6000 mm$^3$ for use with fuels with Methane Number greater than about 60. The method may further comprise directing a fuel-oxidizer mixture into the pre-combustion chamber via the at least one induction port to increase a fuel-oxidizer mixture ratio within said pre-combustion chamber toward a center of said pre-combustion chamber. The method may further comprise directing a fuel-oxidizer mixture into the pre-combustion chamber via the at least one induction port to reduce quenching of said flame kernel on said internal surface of said pre-combustion chamber. The method may further comprise: surrounding a first of said one or more electrodes with a central insulator, said central insulator encased in a shell extending outwardly about said one or more electrodes; and generating flow field forces within said electrode gap sufficient to reduce interaction of said flame kernel with said central insulator. The method may further comprise generating a flow field velocity within said electrode gap of between about 1.0 meter per second and about 100.0 meters per second.

In certain embodiments, a method of distributing a fuel-oxidizer mixture in a pre-combustion chamber is disclosed, comprising providing a pre-combustion chamber comprising: a primary electrode and a ground electrode disposed within the pre-combustion chamber, the primary electrode and the ground electrode disposed a distance radially apart to provide a single electrode gap; at least one induction port which communicates between an external surface and an internal surface of said pre-combustion chamber; the at least one induction port configured to aim at least one infilling stream of said fuel-oxidizer mixture at said internal surface of said pre-combustion chamber; and introducing at least one infilling stream of fuel-oxidizer mixture into the pre-combustion chamber via the at least one induction port. The ground electrode may comprise an electrode surface area greater than about 1 mm$^2$. The pre-combustion chamber may be configured to generate a flow velocity in the single electrode gap of the spark plug that is less than about 100 m/s when a fuel air mixture is ignited in the pre-combustion chamber. The pre-combustion chamber may be configured to generate an average turbulent kinetic energy greater than 1 m$^2$/s$^2$ when a fuel air mixture is ignited in the pre-combustion chamber. The pre-combustion chamber may be configured to generate a substantially uniform lambda distribution in the single electrode gap of the spark plug when a fuel air mixture is ignited in the pre-combustion chamber. The pre-combustion chamber may be configured to generate a lambda fuel air mixture richer than about 2.5 in the single electrode gap of the spark plug when a fuel air mixture is ignited in the pre-combustion chamber. The pre-combustion chamber may be configured to generate a lambda fuel air mixture richer than in a second region between the single electrode gap of the spark plug and a bottom surface of the pre-combustion chamber when a fuel air mixture is ignited in the pre-combustion chamber. The pre-combustion chamber may be configured to generate an average lambda value richer than about 2.5 in the pre-combustion chamber when a fuel air mixture is ignited in the pre-combustion chamber. The volume of the pre-combustion chamber may be between about 1000 mm$^3$ and about 6000 mm$^3$ for use with fuels with energy content greater than about 800 BTU/ft$^3$. The pre-combustion chamber may have a total volume greater than about 1000 mm$^3$ for use with fuels with energy content less than about 800 BTU/ft$^3$. The pre-combustion chamber may have a total volume less than about 6000 mm$^3$ for use with fuels with Methane Number lower than about 60. The pre-combustion chamber may have a total volume between about 1000 mm$^3$ and about 6000 mm$^3$ for use with fuels with Methane Number greater than about 60. The method may further comprise configuring said at least one induction port to aim at least one infilling stream of said fuel-oxidizer mixture at least one point location on said internal surface of said pre-combustion chamber selected from the group consisting of: a core nose of a central insulator, an upper corner of said core nose of said central insulator, one or more electrodes, and said shell. The method may further comprise ricocheting said at least one infilling stream from said internal surface of said pre-combustion chamber to achieve reduced interaction of said flame kernel with said internal surface of said pre-combustion chamber.

In certain embodiments, a pre-chamber unit is disclosed, comprising: a primary electrode and a ground electrode disposed a distance radially apart to provide a single electrode gap; a pre-combustion chamber which at least partially encloses said first electrode and said second electrode; and at least one induction port which communicates between an external surface and an internal surface of said pre-combustion chamber, said at least one induction port configured to direct a fuel-oxidizer mixture into the pre-combustion chamber to generate flow field forces within said pre-combustion chamber which upon ignition of a fuel-oxidizer mixture reduce the interaction of a flame kernel with said internal surface of said pre-combustion chamber. The ground electrode may comprise an electrode surface area greater than about 1 mm$^2$. The pre-combustion chamber may be configured to generate a flow velocity in the single electrode gap of the spark plug that is less than about 100 m/s when a fuel air mixture is ignited in the pre-combustion chamber. The pre-combustion chamber may be configured to generate an average turbulent kinetic energy greater than 1 m$^2$/s$^2$ when a fuel air mixture is ignited in the pre-combustion chamber. The pre-combustion chamber may be configured to generate a substantially uniform lambda distribution in the single electrode gap of the spark plug when a fuel air mixture is ignited in the pre-combustion chamber. The pre-combustion chamber may be configured to generate a lambda fuel air mixture richer than about 2.5 in the single electrode gap of the spark plug when a fuel air mixture is ignited in the pre-combustion chamber. The pre-combustion chamber may be configured to generate a lambda fuel air mixture richer than in a second region between the single electrode gap of the spark plug and a bottom surface of the pre-combustion chamber when a fuel air mixture is ignited in the pre-combustion chamber. The pre-combustion chamber may be configured to generate an average lambda value richer than about 2.5 in the pre-combustion chamber when a fuel air mixture is ignited in the pre-combustion chamber. The volume of the pre-combustion chamber may be between about 1000 mm$^3$ and about 6000 mm$^3$ for use with fuels with energy content greater than about 800 BTU/ft$^3$. The pre-combustion chamber may have a total volume greater than about 1000 mm$^3$ for use with fuels with energy content less than about 800 BTU/ft$^3$. The pre-combustion chamber may have a total volume less than about 6000 mm$^3$ for use with fuels with Methane Number lower than about 60. The pre-combustion chamber may have a total volume between about 1000 mm$^3$ and about 6000 mm$^3$ for use with fuels with Methane Number greater than about 60. The flow field velocity within said electrode gap may have a range of between about 1.0 m/s and about 100.0 m/s. The at least one induction port may be configured to aim at least one infilling stream toward a selected one or more of: a nose of a central insulator, an upper corner of a nose of a central insulator, a lower corner of a nose of a central insulator, a side surface of a nose of a central insulator, and a shell. The internal surface may comprise a central insulator from which said at least one infilling stream is configured to ricochet to generate said flow field forces to increase said fuel-oxidizer mixture ratio in said electrode gap. The pre-combustion chamber may enclose a total volume of between about 800 millimeters$^3$ and about 1000 millimeters$^3$. The at least one induction port may be configured to develop flow field forces which increase mixing of an amount of residual gases within said pre-combustion chamber with said in-filling streams to reduce temperature of said internal surface of said pre-chamber or said amount of residual gases.

Figure 1:
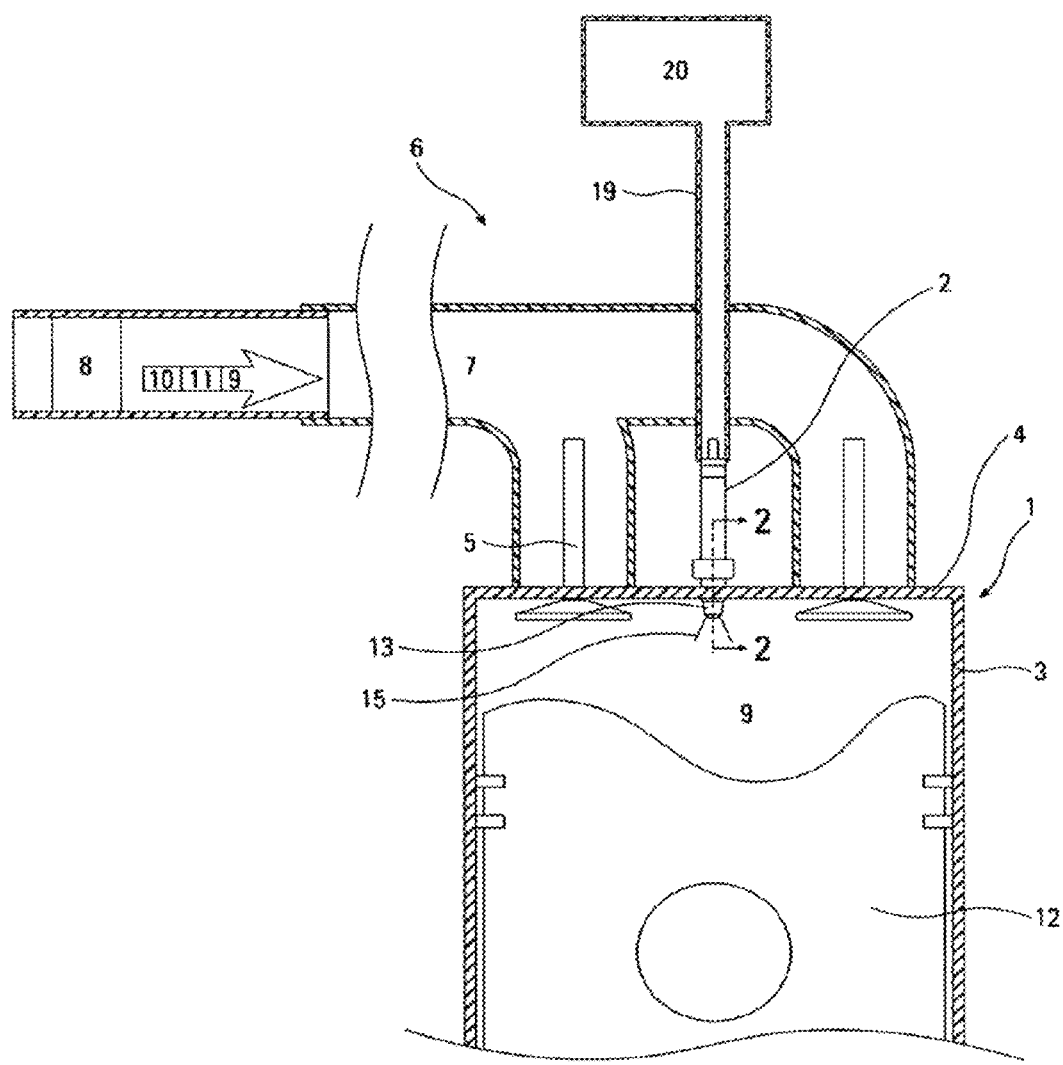
FIG. 1 is a schematic of a reciprocating engine including a particular embodiment of the inventive pre-chamber unit.

Now referring primarily to FIG. 1, a schematic diagram is shown of a reciprocating piston engine (1) including a particular embodiment of the inventive pre-chamber unit (2). The reciprocating piston engine (1) may contain one or more main combustion chambers (3). The engine (1) can have at least one cylinder head (4) and can have one or more valves (5) which can operate to interruptedly allow flow toward or away from each main combustion chamber (3). A fuel-oxidizer mixture intake system (6) provides a supply passage (7) which fluidicly communicates with each of the main combustion chambers (3). A fuel-oxidizer mixture transfer means (8), such as a carburetor, delivers an amount of the fuel-oxidizer mixture (9) through the supply passage (7) to the main combustion chambers (3). The fuel-oxidizer mixture (9) can include an amount of fuel (10) (as examples, natural gas, bio-gas, gasoline, diesel, alcohol, or other fuel, or various combinations thereof), and an amount of oxidizer (11) (such as air, oxygen, nitrous oxide, or other oxidizer, or various combinations thereof).

Delivery of the amount of fuel-oxidizer mixture (9) can be timed in relation to the position of those parts of the engine (1) (such as pistons (12)) coupled to a crankshaft (not shown) which translate the expansion of gases resulting from combustion of the amount of fuel-oxidizer mixture (9) in the corresponding one of the main combustion chambers (3) into rotational motion of the crankshaft of the reciprocating piston engine (1).

Figure 2:
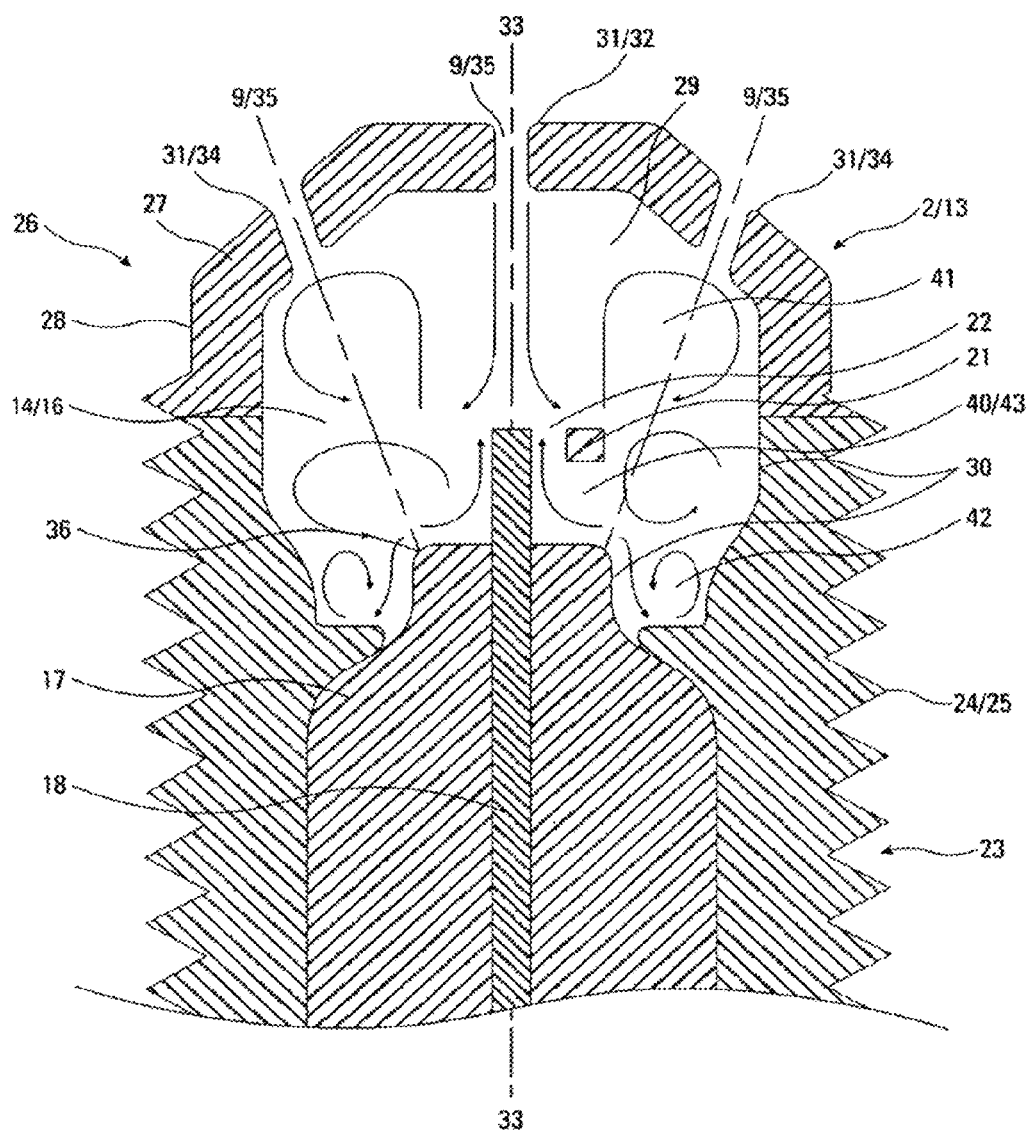
FIG. 2 is an enlarged cross-section view 2-2 as shown in FIG. 1 which shows a particular embodiment of the inventive flow field inside the pre-combustion chamber of a pre-chamber unit.
Figure 4:
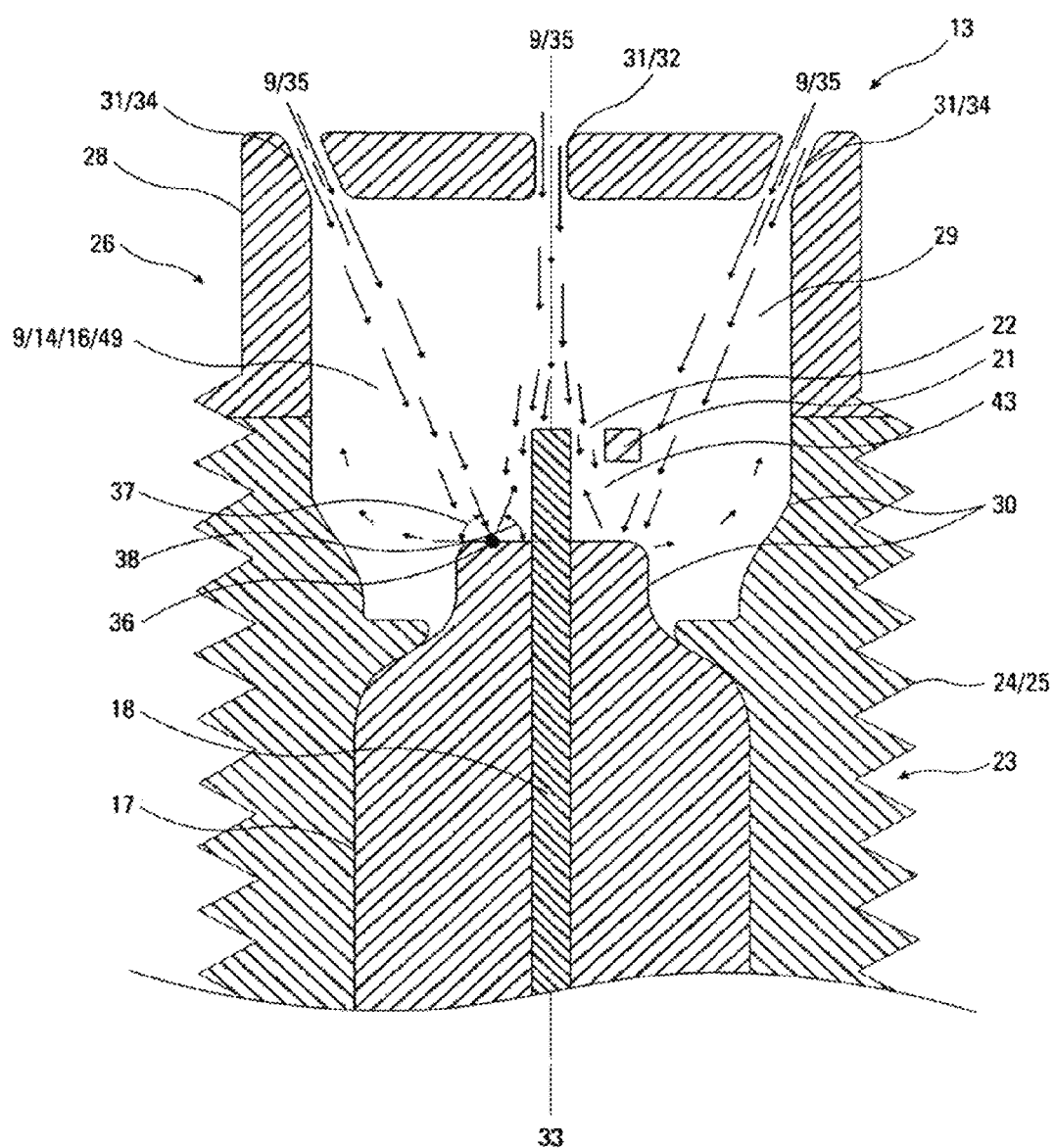
FIG. 4 is an enlarged cross-section view 2-2 as shown in FIG. 1 which shows a particular embodiment of the inventive flow field inside the pre-combustion chamber of a pre-chamber unit.
Figure 5:
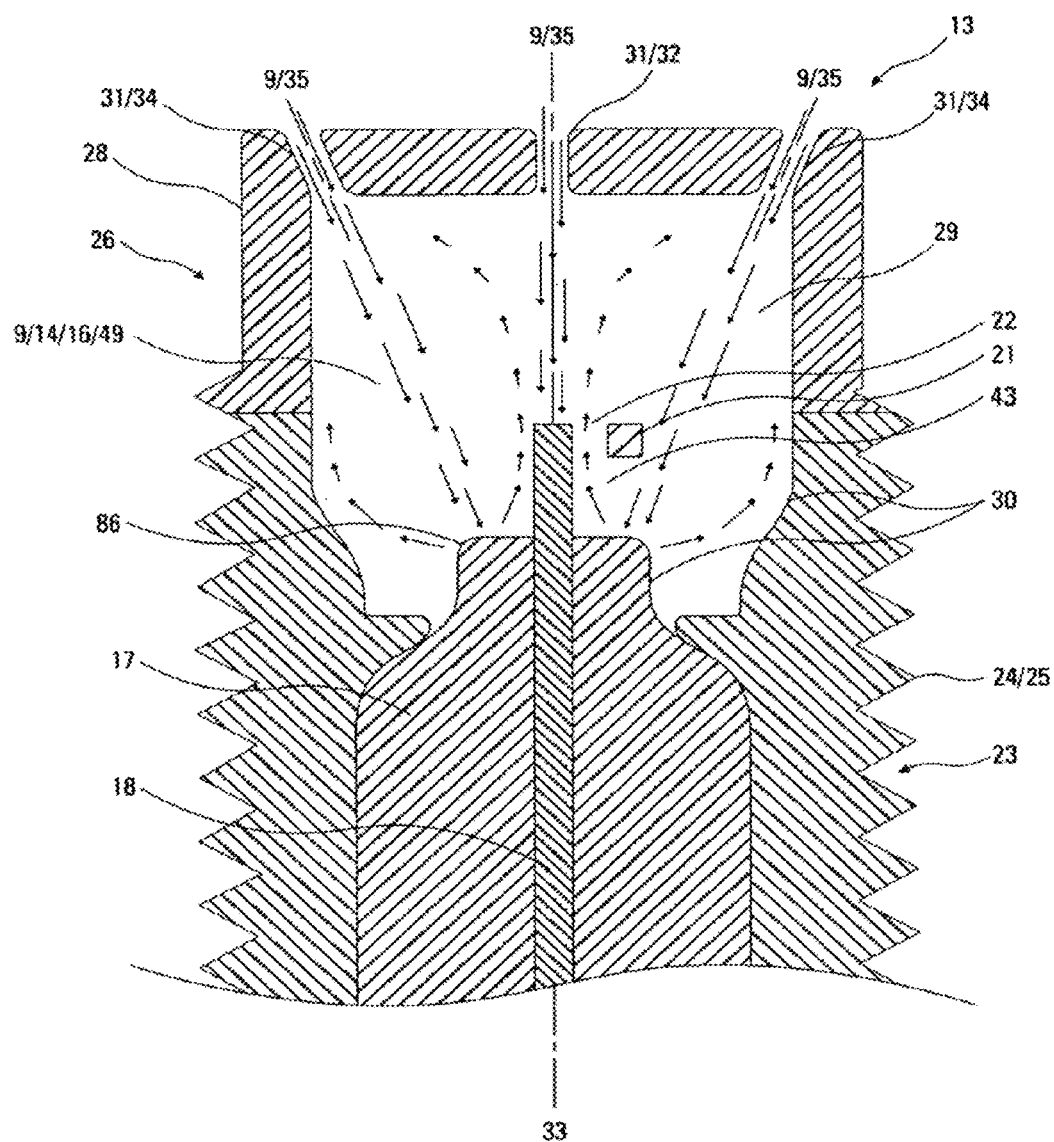
FIG. 5 is an enlarged cross-section view 2-2 as shown in FIG. 1 which shows a second particular embodiment of the inventive flow field inside the pre-combustion chamber of a pre-chamber unit.
Figure 6:
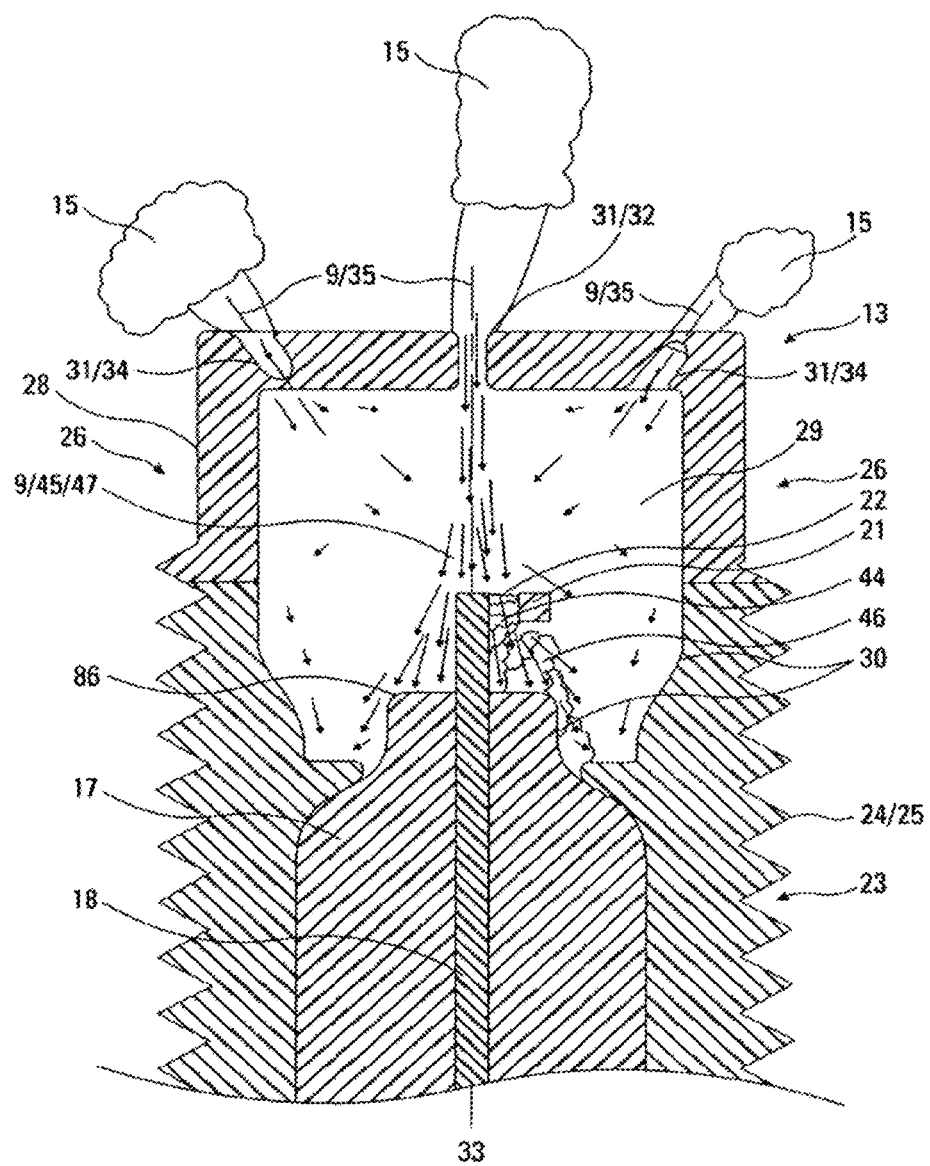
FIG. 6 is an enlarged cross-section view 2-2 as shown in FIG. 1 which shows conventional flame growth and flame jets resulting from combustion of a fuel-oxidizer mixture having a conventional flow field inside the pre-combustion chamber of conventional pre-chamber spark plug.
Figure 7:
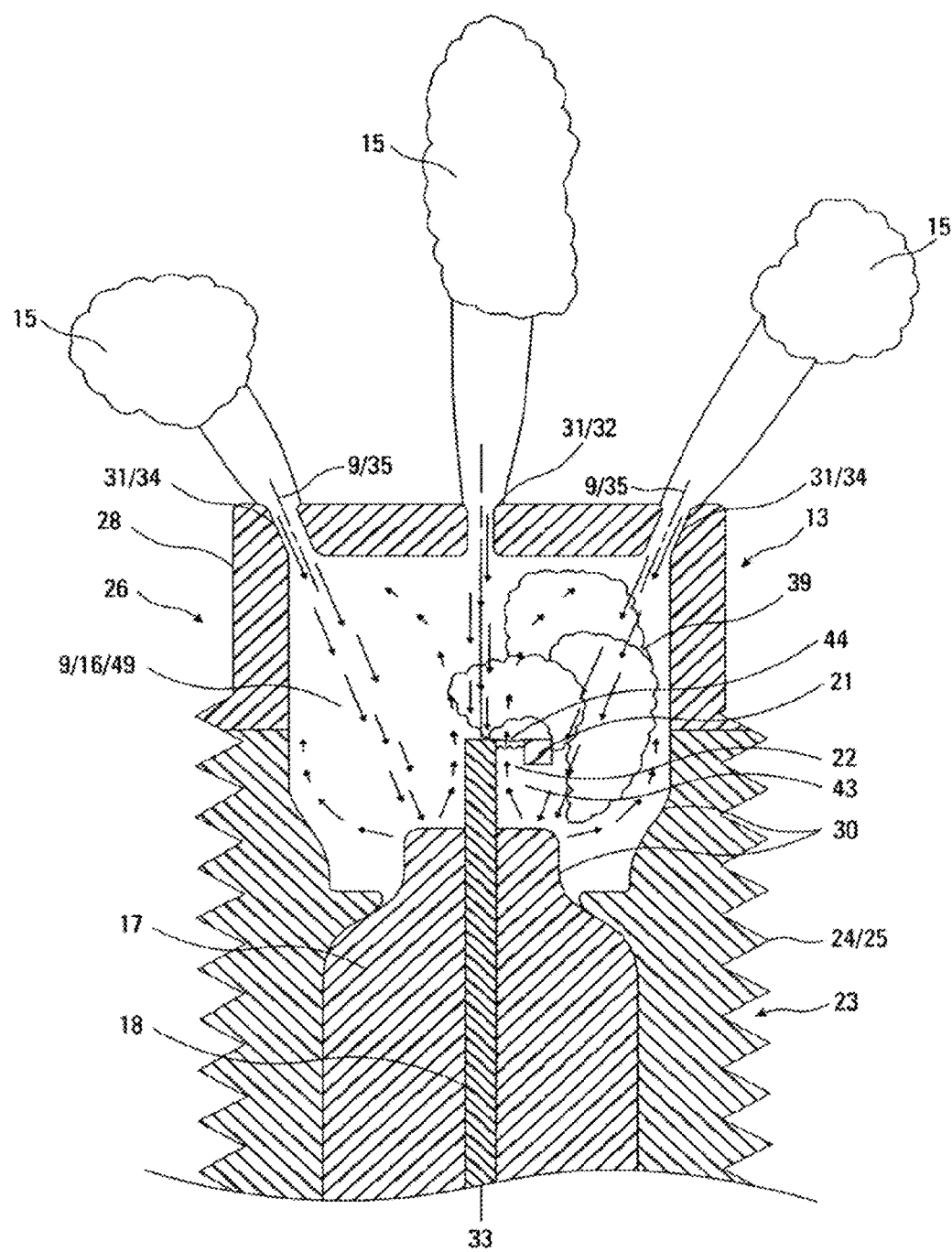
FIG. 7 is an enlarged cross-section view 2-2 as shown in FIG. 1 which shows inventive flame growth and flame jets resulting from combustion of a fuel-oxidizer mixture having an inventive flow field inside the pre-combustion chamber of a pre-chamber unit.

Again referring to FIG. 1, embodiments of the inventive pre-chamber unit (2) can be disposed in relation to the one or more main combustion chambers (3) of the engine (1) such that combustion of fuel-oxidizer mixture (9) within the main combustion chamber (3) of the engine (1) can be initiated in a pre-combustion chamber (13) of the pre-chamber unit (2). The fuel-oxidizer mixture (9) can have a flow field (14) within the pre-combustion chamber (13)(as shown in the examples of FIGS. 2, 4, 5) sufficiently controlled as to pressure, temperature, and distribution to deploy upon ignition one or more flame jets (15) (as shown in the examples of FIGS. 6, 7) into the main combustion chamber (3) to combust the amount of fuel-oxidizer mixture (9) within the main combustion chamber (3). Certain embodiments of the inventive pre-chamber unit (2) can be produced by integration or retro-fitting of the inventive pre-combustion chamber (13) and methods of controlling the flow field (14) and flow field forces (16) (as shown in the examples of FIGS. 2, 4, 5, 10) within the inventive pre-combustion chamber (13) into a numerous and wide variety of conventional mass produced or serial production industrial spark plugs for use with reciprocating piston engines (1); however, the invention is not so limited, and embodiments of the inventive pre-chamber unit (2), inventive pre-combustion chamber (13), and methods which generate inventive flow fields (14) and inventive flow field forces (16) within the inventive pre-combustion chamber (13) can be utilized with a numerous and wide variety of reciprocating piston engines (1) whether configured as 2-stroke engines, 4-stroke engines, or the like, and can be utilized with other types of engines such as rotary engines, Wankel engines, or the like (individually and collectively the "engine").

Now referring primarily to FIGS. 1 and 2, particular embodiments of the inventive pre-chamber unit (2) can include a central insulator (17) which surrounds a central electrode (18). The central electrode (18) (also referred to as the "first electrode") can be connected by an insulated wire (19) to an ignition system (20) (such as an ignition coil or magneto circuit) on the outside the engine (1), forming, with a grounded electrode (21) (also referred to as the "second electrode") an electrode gap (22) (one or more electrodes can be provided in a numerous and wide variety of structural configurations depending upon the application, as further described below). A shell (23), typically formed or fabricated from a metal, can surround or encase a portion of the central insulator (17). The shell (23) provides a shell external surface (24) configured to sealably mate with the cylinder head (4) of the engine (1), typically by mated spiral threads (25) which draw the sealing surfaces together (as shown in the example of FIG. 1) to dispose the pre-combustion chamber (13) of the pre-chamber unit (2) in proper relation to the main combustion chamber (3) for ignition of the fuel-oxidizer mixture (9) therein.

Now referring primarily to FIG. 2, embodiments of the inventive pre-chamber unit (2) provide a pre-combustion chamber (13). The pre-combustion chamber (13) can be formed by the shell (23) extending outwardly to at least partially enclose the central electrode (18) and the grounded electrode (21) (as shown in the examples of FIGS. 25-27 and 29). As to particular embodiments, the pre-combustion chamber (13) can be formed by coupling a pre-combustion chamber element (26) to the base of the shell (23) (as shown in the examples of FIGS. 2-7, 30-32 and 34). The various embodiments of the pre-combustion chamber (13) can have a pre-combustion chamber wall (27) having pre-chamber external surface (28) disposed toward the internal volume of the main combustion chamber (3). The pre-combustion chamber internal surface (30) includes the corresponding internal surface of the shell (23), the pre-combustion chamber element (26), the central insulator (17), or other internal surfaces which enclose a pre-combustion chamber volume (29) (individually and collectively referred to as the "internal surface" (30)).

The internal surface (30) of the pre-combustion chamber (13) whether formed by extension of the shell (23) or by coupling of a pre-combustion chamber element (26) to the base of the shell (23), or otherwise, can further provide one or more induction-ejection ports (31)(also referred to as "induction ports") which communicate between the pre-combustion chamber external surface (28) and the pre-combustion chamber internal surface (30) of the pre-combustion chamber (13). The one or more induction ports (31) can be configured to transfer an amount of the fuel-oxidizer mixture (9) from the main combustion chamber (3) into the pre-combustion chamber (13) and to deploy flame jets (15) from the pre-combustion chamber (13) into the main combustion chamber (3).

Combustion of the amount of fuel-oxidizer mixture (9) inside of the pre-combustion chamber (13) can be initiated by generation of a spark across the electrode gap (22). The induction ports (31) can be configured to deploy flame jets (15) into the main combustion chamber (3) at a location which results in combustion of the amount of fuel-oxidizer mixture (9) within the main combustion chamber (3).

Again referring primarily to FIG. 2, as to certain embodiments of the invention an axial induction port (32) can be substantially axially aligned with the central longitudinal axis (33) of the pre-chamber unit (2). As to certain embodiments, one or more side induction ports (34) can be disposed in radial spaced apart relation about the central longitudinal axis (33). Certain embodiments of the invention can provide both an axial induction port (32) and one or more side induction ports (34) (as shown in the examples of FIGS. 2-7 and 33-38); however, the invention is not so limited, and particular embodiments of the invention may only provide an axial induction port (32) or only side induction ports (34) depending on the application. Upon compression of the amount of fuel-oxidizer mixture (9) in the main combustion chamber (3), a portion of the amount of fuel-oxidizer mixture (9) can pass through the axial induction port (32) and the side induction ports (34) as a corresponding one or more in-filling streams (35). The in-filling streams (35) of the fuel-oxidizer mixture (9) can create the flow field (14) having flow field forces (16) (represented in the examples of FIGS. 3 through 11 by arrow heads pointing in the direction of flow and the velocity being greater with increasing length of the arrow body which allows comparison of conventional flow fields and inventive flow fields) inside of the pre-combustion chamber volume (29).

The flow field (14) and the flow field forces (16) can be analyzed using computational fluid dynamics ("CFD"). Computers were used to perform the calculations required to simulate the interaction of fuel-oxidizer mixture (9) and flame growth (39) with the internal surface (30) of the pre-combustion chamber (13) defined by the various embodiments of inventive pre-chamber units (2) and conventional pre-chamber spark plugs. CONVERGE™ CFD software offered by Convergent Science, Inc. was used in analysis of flow fields (14) and flow field forces (16) of inventive pre-chamber units (2) and conventional pre-chamber spark plugs. CFD can be used to calculate increasing fuel-oxidizer mixture (9) ratio inward of the internal surface (30) of the pre-combustion chamber (13)(or toward the center of the pre-combustion chamber), decreasing fuel-oxidizer mixture (9) ratio approaching the internal surface (30) of pre-combustion chamber (13), or reducing flow field (14) velocities approaching the internal surface (30) of pre-combustion chamber (13).

First, a pre-combustion chamber (13) whether conventional or including one or more features in accordance with the invention can be analyzed using CFD to quantify the flow field forces (16) and flow field velocities approaching the internal surface (30) of pre-combustion chamber (13) and can also be used to quantify the distribution of fuel-oxidizer mixture (9) ratio in relation to the internal surface (30) of the pre-combustion chamber (13). Secondly, the induction ports (31) of pre-combustion chamber (13) can be modified by altering one or more of the diameter (72), length (71), angle (78), radius (75) from the central axis (33), the number of side induction ports (34), or swirl offset (77) (as shown in the examples of FIGS. 28, 29, and 35). This list of modifications is not intended to be inclusive of all modifications or combinations or permutations of modifications possible, but are sufficient along with the description and figures for a person of ordinary skill to make and use a numerous and wide variety of pre-chamber units (2) encompassed by the invention. Then, through CFD, an analysis can be performed to quantify the flow field forces (16) and flow field velocities approaching the internal surface (30) of pre-combustion chamber (13) and also quantify the distribution of fuel-oxidizer mixture (9) ratio in relation to the internal surface (30) of pre-combustion chamber (13). The analysis of the first CFD can be compared to the second CFD to determine if there is a reduction of flow field forces (16) and velocities approaching internal surface (30) of pre-combustion chamber (13), an increasing of fuel-oxidizer mixture (9) ratio inward of internal surface (30) of pre-combustion chamber (13), or a decreasing of fuel-oxidizer mixture (9) ratio approaching internal surfaces (30) of pre-combustion chamber (13).

CFD can also be used to calculate increasing rate of flame growth (39), reduced rate of flame growth (39) due to interaction or engulfment with internal surface (30) of pre-combustion chamber (13), or reduced quenching of flame growth (39) on internal surface (30) of pre-combustion chamber (13) (as shown in the examples of FIGS. 6 and 7). First, a pre-combustion chamber (13) can be analyzed using CFD to locate the flame kernel (44) with relation to the internal surface (30) and quantify the flame growth (39) rate within the pre-combustion chamber (13). Secondly, the induction ports (31) can be modified as previously described. Then, through CFD, an analysis can be performed to locate the flame kernel (44) in relation to the internal surface (30) and quantify the flame growth (39) rate within the pre-combustion chamber (13). The analysis of the first CFD can be compared to the second CFD to determine increasing flame growth (39) rate, reduced interaction or engulfment of the flame kernel (44) with the internal surface (30) of the pre-combustion chamber (13), or reduced quenching of the flame kernel (44) on the internal surface (30) of the pre-combustion chamber (13).

A specially configured instrumented optical engine, combined with high speed Schlieren and Planar Laser Induced Fluorescence photography can be used to experimentally verify the CFD analytical results in terms of increasing flame growth (39) rate, reduced interaction of flame kernel (44) with internal surface (30) of pre-combustion chamber (13), reduced quenching of flame kernel (44) on internal surface (30) of pre-combustion chamber (13), increasing fuel-oxidizer mixture (9) ratio inward of internal surface (30) of pre-combustion chamber (13), decreasing fuel-oxidizer mixture (9) ratio approaching internal surface (30) of pre-combustion chamber (13), or reducing flow field (14) velocities approaching internal surface (30) of pre-combustion chamber (13). Further measurements on engine combustion performance, such as Heat Released Rate (HRR) and Brake Thermal Efficiency (BTE), allow the end-effect(s) to be quantified.

Typical comparative measures between conventional pre-chamber spark plugss and pre-chamber units (2) modified in accordance with the invention are listed in the first column of Table 1 and include flow field velocity meters per second ("m/s") approaching the internal surface (30) of the pre-combustion chamber (13), interaction between flame growth (39) and quenching surfaces millimeters squared ("$mm^2$") of the pre-combustion chamber (13), flame jet (15) momentum gram-meter per second ("g-m/s"), flame growth rate m/s, and fuel-oxidizer mixture ratio. Table 1 further lists exemplary values for these measures obtained by CFD for each of conventional pre-chamber units and pre-chamber units modified in accordance with the invention; however, the invention is not limited to these exemplary values and depending upon the application pre-chamber units modified in accordance with the invention in comparison to conventional pre-chamber units may yield greater or lesser differences in one or more of the measures.

TABLE 1

Comparison Between Conventional Pre-chamber Unit and Modified Pre-chamber Unit

| Comparative Measure | Conventional Pre-chamber Unit | Modified Pre-chamber Unit |
| --- | --- | --- |
| Flow Field (14) Velocity [m/s] approaching pre-combustion chamber internal surface (30) | 30-35 | 15-18 |
| Interaction or Engulfment Between Flame Growth (39) surface and Quenching Surfaces [$mm^2$] | 50 | 5 |
| Flame Jet (15) Momentum [g-m/s] | 800 | 2800 |
| Flame Growth (39) Rate [m/s] | 7 | 24 |
| Fuel-Oxidizer Mixture (9) Ratio | 0.036 | 0.038 |

Now referring primarily to FIGS. 2, 4, and 5, the structure of the pre-combustion chamber external surface (28) and pre-combustion chamber internal surface (30) of the pre-combustion chamber (13), the pre-chamber volume (29), the structure of the axial induction port (32), the structure of one or more side induction ports (34), and the overall structural relationship of one or more of these structures (such as the distance of the axial induction port (32) or the one or more side induction ports (34) from a point location (36) on the internal surface (30) which can be a pre-determined distance based on CFD analysis), as further described below), can be altered to correspondingly alter characteristics of the in-filling streams (35) as to the amount of flow, the velocity of flow, the direction of flow, the interaction of the in-filling streams (35) with the internal surface (30) of the pre-combustion chamber (13) such as a point location (36)) (which can be a pre-determined point location (39) based on CFD analysis), angle of incidence (37) in relation to the point location (36)(which can be a pre-determined angle of incidence (37) based on CFD analysis), at the point location (36), angle of rebound (38) (which can be a pre-determined angle of rebound (38) based on CFD analysis) or redirection from the point location (36)(also referred to as "ricochet"), velocity of rebound from the point location (36), or the like, as further described below. Alteration of the structures of the pre-combustion chamber (13) or the induction ports (32)(34) to alter characteristics of the in-filling streams (35) can correspondingly alter characteristics of the flow field (14) and associated flow field forces (16) inside of the pre-combustion chamber (13) to provide certain advantages as compared to the characteristics of conventional flow fields and conventional flow field forces achieved in conventional pre-chamber spark plugs.

FIGS. 2 and 4, provide illustrative examples of the results that can be obtained using methods of distributing a fuel-oxidizer mixture (9) in a pre-combustion chamber (13) of a pre-chamber unit (2) and the advantageous recirculation patterns that can be achieved in the flow field (14) inside the pre-combustion chamber (13) by modification of the structures of the pre-combustion chamber (13) or the induction ports (32)(34), or both, in accordance with the invention. As to particular embodiments of the invention, the structure of one or more side induction ports (34) in relation to the internal surface (30) of the pre-combustion chamber (13) can achieve in-filling streams (35) directed toward the internal surface (30) of the pre-combustion chamber (13), such as a point location (36) on the shell (23), the central insulator (17), the central electrode (18), or other locations or regions of internal surface (30), such parameters can be adjusted to achieve similar advantageous results between a numerous and wide variety of different firing ends (53) (or electrode configurations) enclosed by the pre-combustion chamber (13) of inventive pre-chamber units (2) (see the examples of FIGS. 18 through 24, as further described below).

Again referring primarily to FIGS. 2, 4 and 5, as to a numerous and wide variety of embodiments of the invention, the pre-combustion chamber (13) and associated axial induction port (32) or one or more of the side induction ports (34) can be structured to generate characteristics in the in-filling streams (35) to achieve a "ricochet effect". In accordance with embodiments of the invention, the term "ricochet effect" means a rebound, a re-direction, an angle of deflection (38), or the like, of one or more in-filling streams (35) from a corresponding one or more point location(s)(36) on the internal surface (30) of the pre-combustion chamber (13) to generate a flow field (14) and associated flow field forces (16) inside of the pre-combustion chamber volume (29) which by comparison to the conventional pre-chamber spark plugs increases fuel-oxidizer mixture (9) ratio toward the center of the pre-combustion chamber (13) or reduces interaction of flame growth (39) with the internal surface (30) of the pre-combustion chamber (13). Increasing the fuel-oxidizer mixture (9) ratio toward the center of the pre-combustion chamber (13) or reducing the interaction of flame growth (39) or flame kernel (44) with the internal surface (30) of the pre-combustion chamber (30) can, upon ignition of the fuel-oxidizer mixture (9) through a spark bridging the electrode gap (22) inside of the pre-combustion chamber (13), substantially increase fuel-oxidizer combustion rate and substantially increase flame growth (39) and the momentum of flame jets (15) deployed into the main combustion chambers (3) (as shown by the comparison of FIGS. 6 and 7, as further described below).

The ricochet effect with respect to the in-filling streams (35) can result in flow field forces (16) sufficient to generate a flow field (14) having one or more flow recirculation zones (40)(41)(42) or combinations of flow recirculation zones (40)(41)(42) inside of the pre-combustion chamber (13)

which may be entirely lacking, substantially lacking, or can be enhanced in comparison to the conventional flow fields of conventional pre-chamber spark plugs, which may otherwise be structurally or substantially identical.

Again referring primarily to FIG. 2, achieving the ricochet effect of the in-filling streams (35) can result in one or more of a first recirculation zone (40), a second recirculation zone (41), and a third recirculation zone (42) of the flow field (14) inside the pre-combustion chamber (13). Each of the recirculation zones (40)(41)(42) achieved can provide certain advantages over conventional flow fields.

The first recirculation zone (40) can achieve a counter flow region (43) in the flow field (14) associated with the electrode gap (22) having sufficient flow field forces (16) upon ignition of the fuel-oxidizer mixture (9) inside the pre-combustion chamber (13) to move the flame kernel (44) away from the internal surface (30) of the pre-combustion chamber (13), or reduce movement or velocity toward the internal surface (30), or flame quenching surfaces, of the pre-combustion chamber (13) (as shown in the example of FIG. 7) to reduce quenching of flame growth (39) caused by interaction with the internal surface (30) of the pre-combustion chamber (13) as compared to conventional flow fields. As to particular embodiments, the flow field forces (16) in the counter flow region (43) can be sufficient to move the spark kernel (44) away from quenching surfaces and into the second recirculation zone (41) (as shown in the example of FIG. 7).

The second recirculation zone (41) can achieve, by comparison with conventional flow fields, an increased fuel-oxidizer mixture (9) ratio (increased mass of fuel per volume or increased fuel concentration) approaching or toward the center of the pre-combustion chamber (13) (or a decreased mass of fuel per volume approaching the internal surface (30) of pre-combustion chamber (13)) which can result in increased combustion rates of the fuel-oxidizer mixture (9) inside the pre-combustion chamber (13) resulting in increased rate of flame growth (39) and increased momentum of flame jets (15) deployed to the main combustion chamber (3) of the engine (1), as compared to conventional flow fields (45) (as shown in the example of FIG. 7).

The third recirculation zone (42) achieves, by comparison with conventional flow fields, increased mixing of residual gases with in-filling streams (35) to correspondingly reduce surface temperatures and residual gas temperatures within the pre-combustion chamber (13), thereby reducing the tendency for auto-ignition of the fuel-oxidizer mixture (9) inside the pre-combustion chamber (13).

Figure 3:
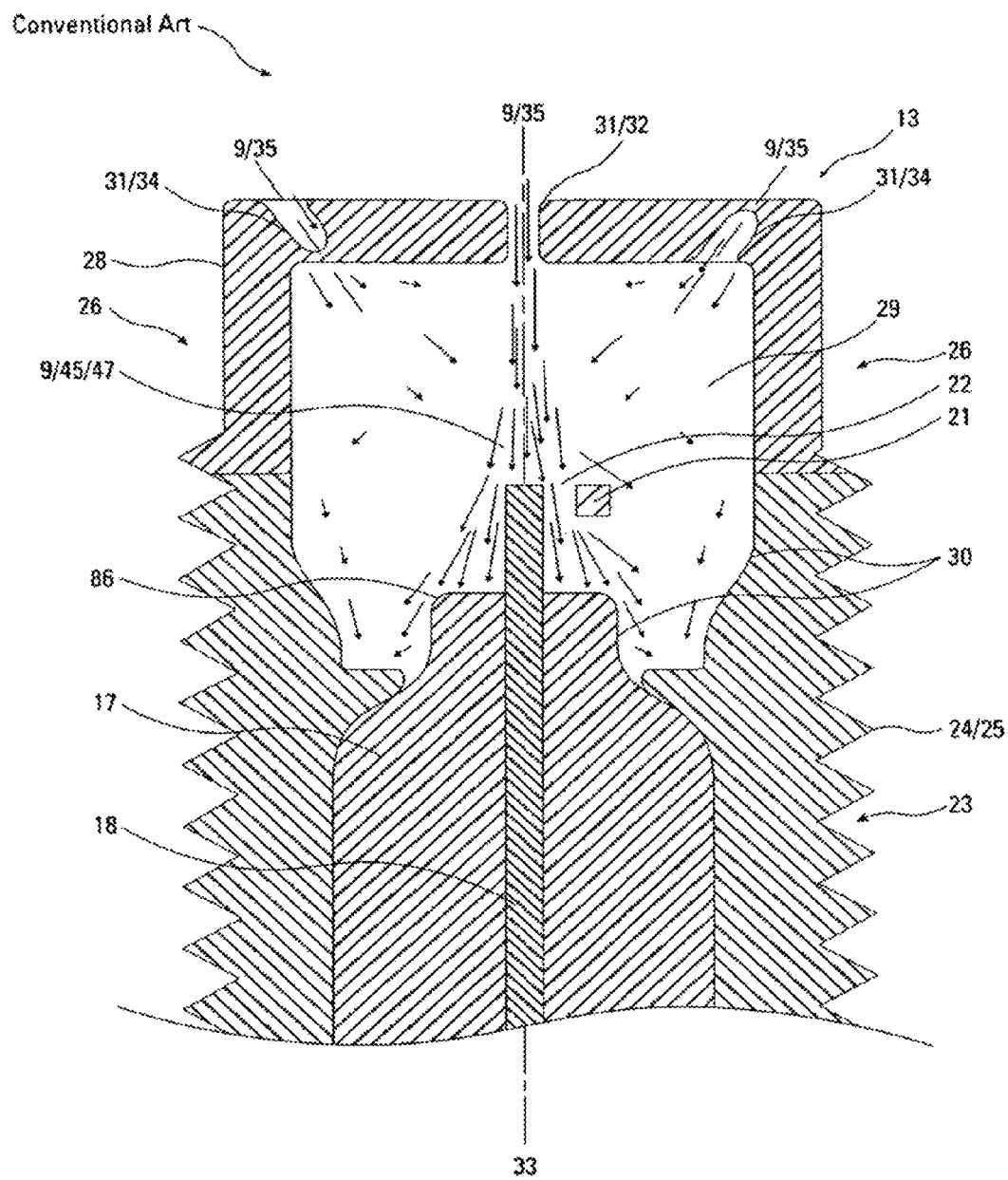
FIG. 3 is an enlarged cross-section view 2-2 as shown in FIG. 1 which shows a conventional flow field inside the pre-combustion chamber of conventional pre-chamber spark plug.

Now referring primarily to FIGS. 3 through 5, which provide side by side comparisons of pre-combustion chambers (13) having substantially the same structure in cross section. FIG. 3 shows a conventional flow field (45) which has not achieved the ricochet effect. FIGS. 4 and 5 show embodiments of the inventive flow field forces (16) in which the in-filling streams (35) have created the ricochet effect. As can be understood by comparison of the direction and velocity of the inventive flow field forces (16) (as shown in the example of FIG. 4) and the conventional flow field forces (47) (as shown in the example of FIG. 3)(arrow heads pointing in the direction of flow and the velocity being greater with increasing length of the arrow body) within the respective pre-combustion chambers (13), the conventional flow field (45) (as shown in the example of FIG. 3) results in greater velocity of the fuel-oxidizer mixture (9) inside the electrode gap (22) moving toward the internal surface (30) as compared with the inventive flow field forces (16) resulting from the ricochet effect (as shown in the example of FIG. 4) which has a lesser velocity of the fuel-oxidizer mixture (9) toward and approaching the internal surface (30) of the pre-combustion chamber (13). The comparatively greater velocity of the fuel-oxidizer mixture (9) moving toward and approaching internal surface (30) of the pre-combustion chamber (13) (as shown in the example of FIG. 3), such as the central insulator (17) (including any one or more of the nose (86), lower corner of the nose, the side surface of the nose), can upon ignition correspondingly move or locate the flame kernel (44) toward the quenching surfaces of the central insulator (17) (as shown in the example of FIG. 6) as compared to the inventive flow field forces (16) (as shown in the example of FIG. 4) which has a lesser velocity of the fuel-oxidizer mixture (9) moving toward and approaching the internal surface (30) of the pre-combustion chamber (13)) which upon ignition comparatively locates the flame kernel (44) further away from quenching surface of the central insulator (17)(as shown in the example of FIG. 7).

Now referring primarily to FIG. 5, as to certain embodiments, the structure of the pre-combustion chamber (13) and induction ports (31) can achieve sufficient ricochet effect to generate embodiments of the inventive flow field (14) inside of the pre-combustion chamber (13) having sufficient flow field forces (16) to generate a counter flow region (43) in the electrode gap (22) and even extending about the first electrode (18) and the second electrode (21). The counter flow region (43) rather than reducing the velocity of the fuel-oxidizer mixture (9) toward and approaching the internal surface (30) as achieved by the example of FIG. 4 can in comparison to conventional pre-chamber spark plugs reverse the direction of flow field forces (16) or create the counter flow region (43) in the region of the electrode gap (22), and even about the first electrode (18) and the second electrode (21), which moves away from internal surface (30) of the pre-combustion chamber (13) and generally toward the center of the pre-combustion chamber (13). Upon ignition of the fuel-oxidizer mixture (9), the flow field forces (16) can be sufficient to move the flame kernel (44) away from quenching surface the central insulator (17) (as shown in the example of FIG. 7) and move flame growth (39) toward or into the second recirculation zone (41) having an increased mass of fuel per unit volume or increased fuel-oxidizer mixture ratio, as compared to conventional pre-chamber spark plugs. Combustion of the fuel-oxidizer mixture (9) in embodiments of the flow field forces (16) achieving the counter flow region (43) as compared to combustion of the fuel-oxidizer mixture (9) in conventional flow fields (45), can occur at substantially increased rates producing flame jets (15) of substantially increased momentum in the main combustion chamber (3) of an engine (1).

Now referring primarily to FIG. 6 and FIG. 7, which provide side by side comparisons of pre-combustion chambers (13) having substantially the same structure in cross section. FIG. 6 shows conventional flame growth (46) in a pre-combustion chamber (13) in which in-filling streams (35) do not achieve the ricochet effect. FIG. 7 shows inventive flame growth (39) which occurs in embodiments of the inventive flow field (14) having achieved the ricochet effect. As can be understood, the conventional flow field (45) (as shown in the example of FIG. 6) within a pre-combustion chamber (13) has, upon ignition of the fuel-oxidizer mixture (9), sufficient velocity within the region of the electrode gap (22) to move the flame growth (39) toward flame quenching surfaces of the central electrode (18), central insulator (17), and the shell (23). As to particular embodiments, the inventive flow field (14) velocity within the electrode gap (22) can be between about 1.0 meters per second and about 100.0 meters per second. As above discussed, increased interaction or engulfment of flame kernel (44) and conventional flame growth (45) with quenching surfaces can reduce the rate at which the fuel-oxidizer mixture (9) burns in the pre-combustion chamber (13) and correspondingly reduces the rate of flame growth and the momentum of the flame jets (15) deployed into the main combustion chamber (3) of engines (1).

Now referring primarily to FIG. 7, which illustrates flame growth (39) in a pre-combustion chamber (13) having a flow field (14) which has achieved the ricochet effect. The ricochet effect confers several advantages over conventional flow fields (45). Firstly, the ricochet effect can generate flow field forces (16) in the electrode gap (22), as above described, which can be sufficient to move the flame kernel (44) within the electrode gap (22) away from the internal surface (30) (for example, the central insulator (17) and shell (23) in the example of FIG. 7) which can impede, arrest, or slow (collectively "quench") flame growth (39). By reducing interaction or engulfment of the flame kernel (44) with the internal surface (30) of the pre-combustion chamber (13) that quenches flame growth (39) there can be a substantial increase in the rate of combustion of the fuel-oxidizer mixture (9) in pre-combustion chamber (13). Secondly, movement of the flame kernel (44) in the electrode gap (22) toward the center of the pre-combustion chamber (13) can promote flame growth (39) in the direction of the second recirculation zone (41), which as above described, can have an increased fuel-oxidizer mixture (9) ratio (greater mass of fuel per unit volume or greater fuel concentration) approaching the center of the pre-combustion chamber (13). The movement of the flame kernel (44) toward greater fuel concentration inside of the pre-combustion chamber (13) can result in substantially increased combustion rates of the fuel-oxidizer mixture (9) inside of the pre-combustion chamber (13) and substantially greater momentum of flame jets (15) deployed into the main combustion chamber (3) of an engine (1).

Figure 8:
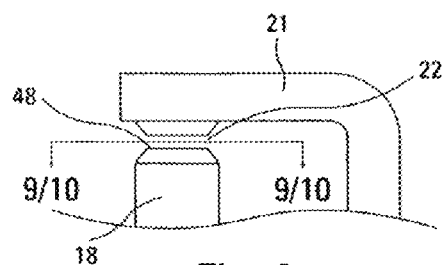
FIG. 8 is a side view of a first electrode and a second electrode in the form of a J-gap.
Figure 9:
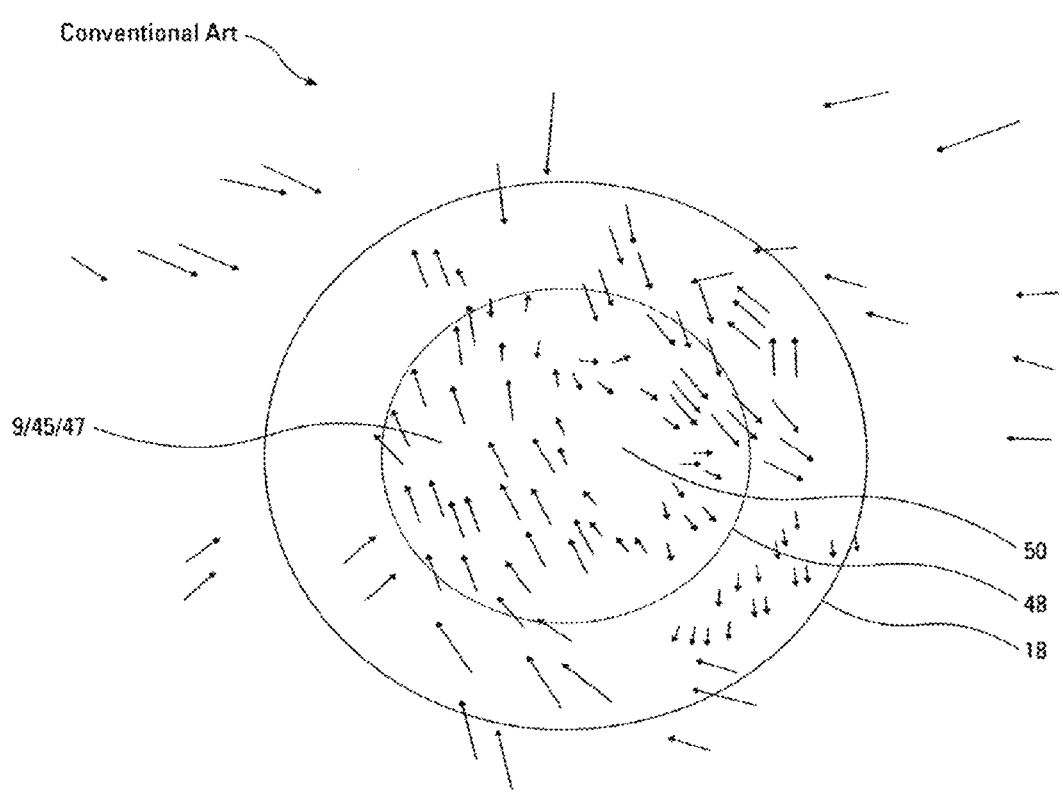
FIG. 9 is an enlarged cross-section top view of the first electrode shown in FIG. 8 which shows a conventional flow field and conventional flow field forces in the electrode gap of the J-gap.
Figure 10:
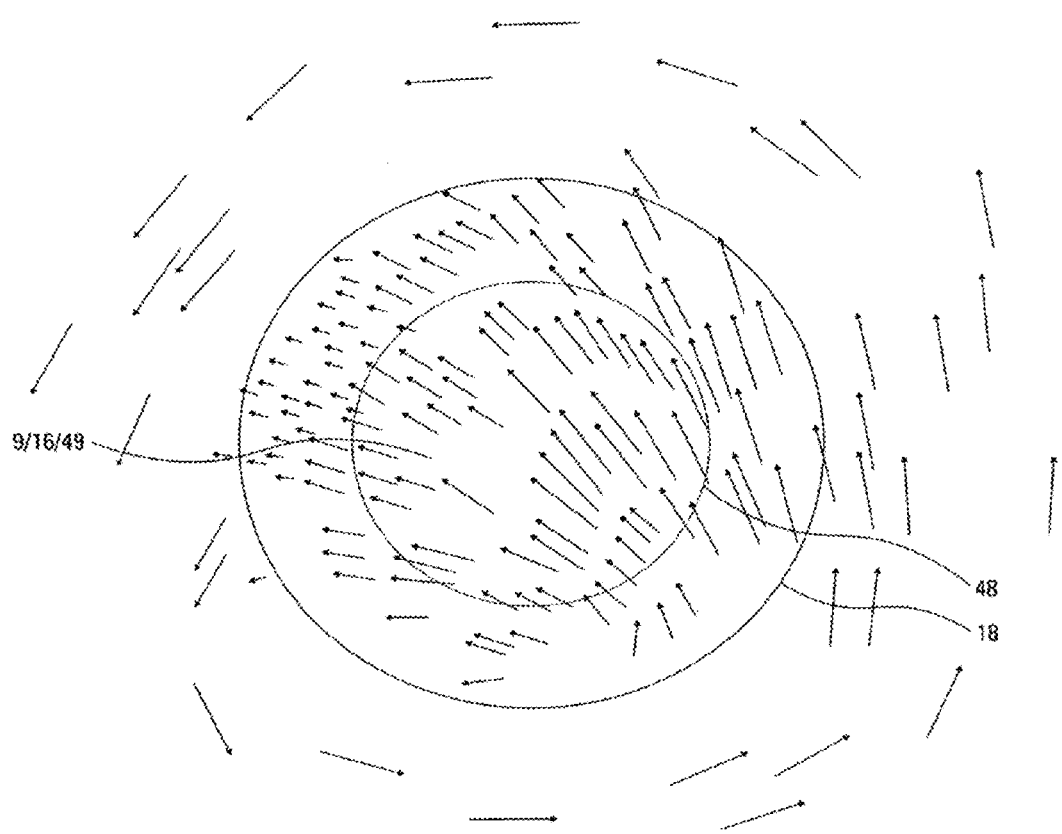
FIG. 10 is an enlarged cross-section top view of the first electrode shown in FIG. 8 which shows an inventive flow field and inventive flow field forces in the electrode gap of the J-gap.

Now referring to FIG. 8 which shows a cross section 9/10-9/10 which allows comparison of conventional flow field forces (47) in relation to the electrode top (48) of the central electrode (18) of a J-gap electrode (as shown in the example of FIG. 9) and inventive flow field forces (49) in relation to the electrode top (48) of a similarly configured central electrode (18) of a J-gap electrode (as shown in the example of FIG. 10).

Now referring primarily to FIG. 9, the arrows represent the directions and velocities of conventional flow field forces (47) in the electrode gap (22) of a J-gap electrode in conventional pre-chamber plugs which have not achieved the ricochet effect, above described. As shown, the conventional flow field (45) and the corresponding conventional flow field forces (47) can be substantially disorganized with directions of flow field (14) in several directions which can result in regions within the electrode gap (22) which have low flow velocities or even dead zones (50) that have no flow fields (14). This can result in quenching as there are no flow field forces (16) to move the flame kernel (44) away from the quenching surfaces.

Figure 11:
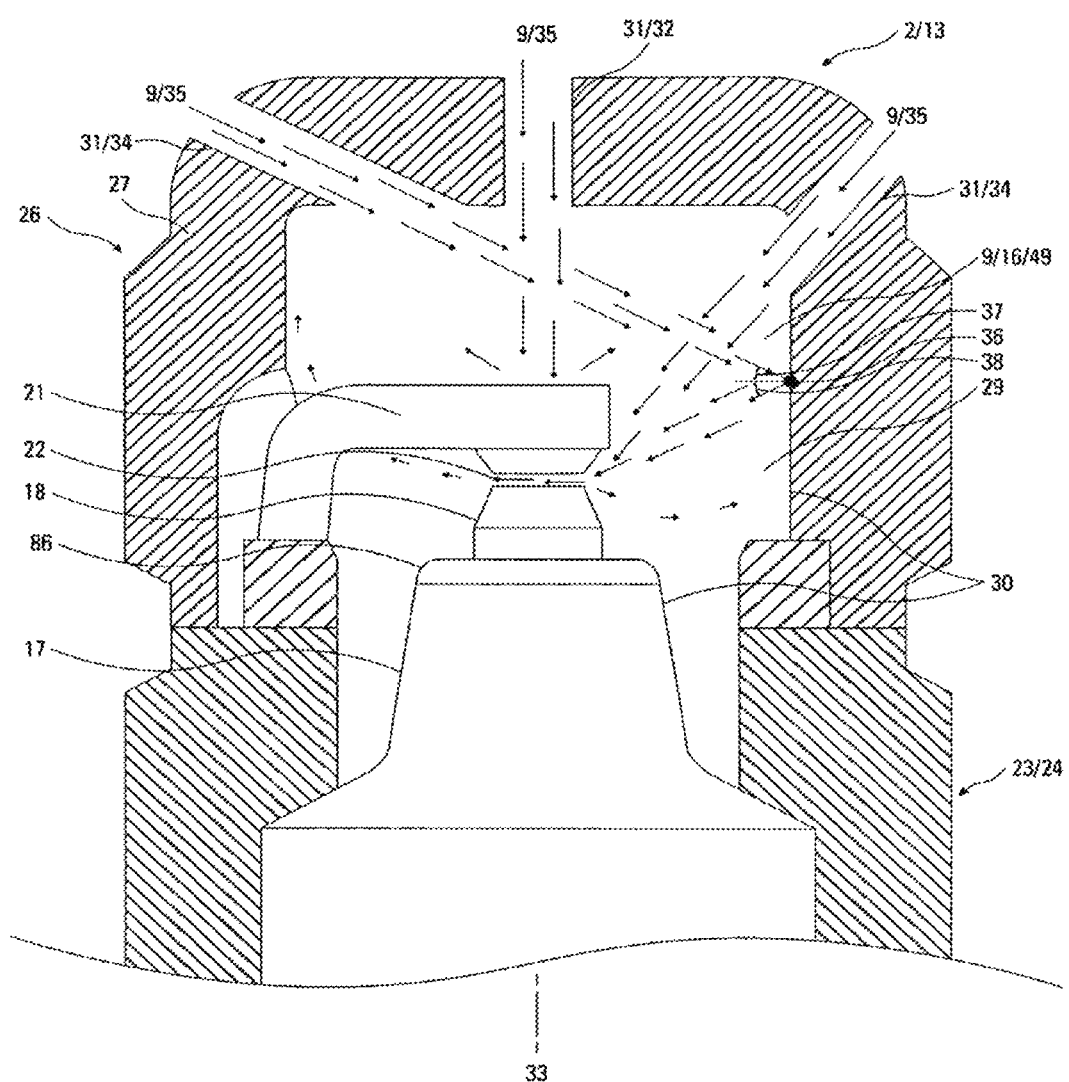
FIG. 11 is an enlarged cross-section view 2-2 as shown in FIG. 1 which shows a particular embodiment of the inventive flow field inside the pre-combustion chamber of a pre-chamber unit which creates the inventive flow field and inventive flow field forces in the electrode gap of the J-gap shown in FIG. 10.

Now referring primarily to FIG. 10, the arrows represent the directions and velocities of an embodiment of the inventive flow field forces (49) in the electrode gap (22) of a J-gap electrode in embodiments of the inventive pre-combustion chamber unit (13) which have achieved the ricochet effect in relation to the electrode gap (22) of a J-gap electrode, as described in greater detail in the example of FIG. 11. As shown, the inventive flow field forces (49) and the corresponding inventive flow field (14) can have comparatively greater organization or uniformity with the direction of flow of the fuel-oxidizer mixture (9) in substantially one direction, with greater velocity, and outward from the electrode gap (22) and quenching surfaces, or combinations thereof. This can reduce quenching of the flame kernel (44) as there are sufficient flow field forces (16) to quickly move the flame kernel (44) away from the surfaces.

Now referring primarily to FIG. 11, the pre-combustion chamber (13) and induction ports (31)(34) can be configured in regard to one or more aspects as above described to achieve ricochet of the in-filling streams (35) from one or more point locations (36) on the internal surface (30) of the pre-combustion chamber (13) which enclose a first electrode (18) and a second electrode (21) in a J-gap configuration. As shown, a particular embodiment can include an axial induction port (32) which directs an in-filling stream (35) toward the second electrode (21) (also referred to as a ground strap). One or more side induction ports (34) (or a first set (51) of side induction ports (34) and a second set (52) of side induction ports (34)) can be configured to direct in-filling streams (35) towards corresponding point locations (36) on the opposing internal surface (30) of the shell (23). The configuration of the one or more side induction ports (34) (or a first set (51)) can result in an angle of incidence (37) and an angle of deflection (38) in relation to the one or more point locations (36) to ricochet toward the electrode gap (22). Additionally one or more side induction ports (34) or a second set (52) can be directed toward the electrode gap (22). The combined effect of the ricocheted and directed in-filling streams (35) can generate advantageous inventive flow field forces (49) and inventive flow fields (14) in the pre-combustion chamber (13) enclosing first and second electrodes (18)(21) in the J-gap form.

Figure 12:
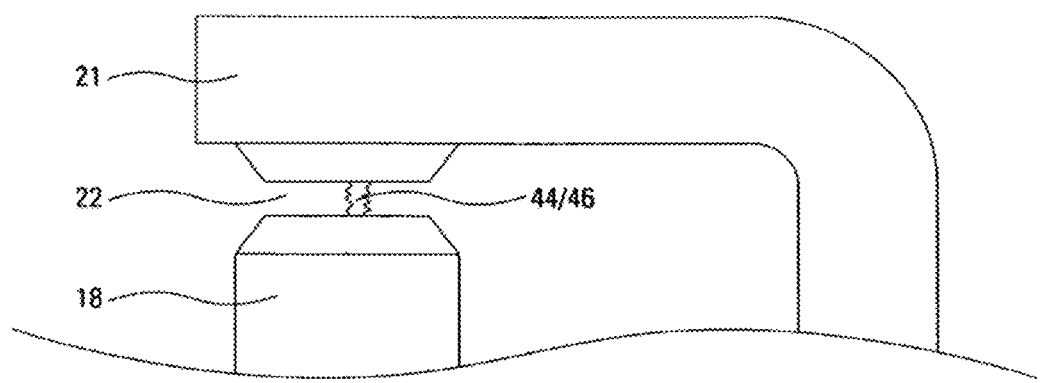
FIG. 12 is an enlarged side view of a first electrode and a second electrode in the form of a J-gap structure which illustrates conventional initial flame growth resulting from conventional flow fields having conventional flow field forces in the electrode gap similar to FIG. 9.
Figure 13:
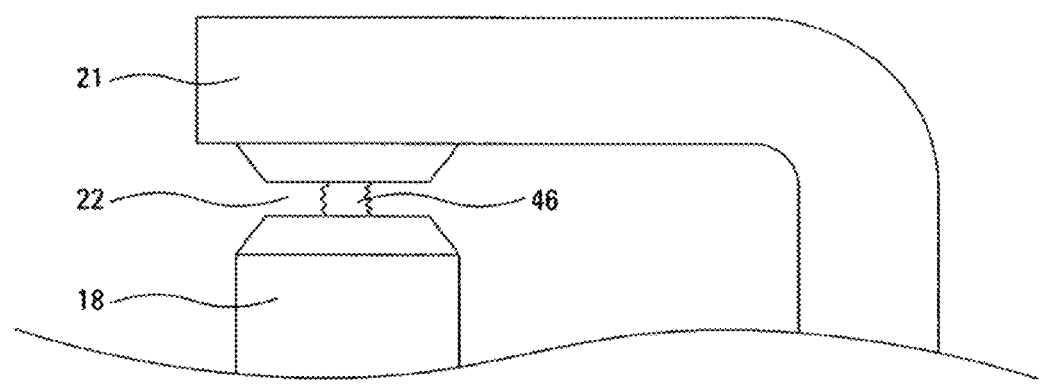
FIG. 13 is an enlarged side view of a first electrode and a second electrode in the form of a J-gap structure which illustrates conventional flame growth subsequent to the initial flame growth shown in FIG. 12 resulting from conventional flow fields having conventional flow field forces in the electrode gap.
Figure 14:
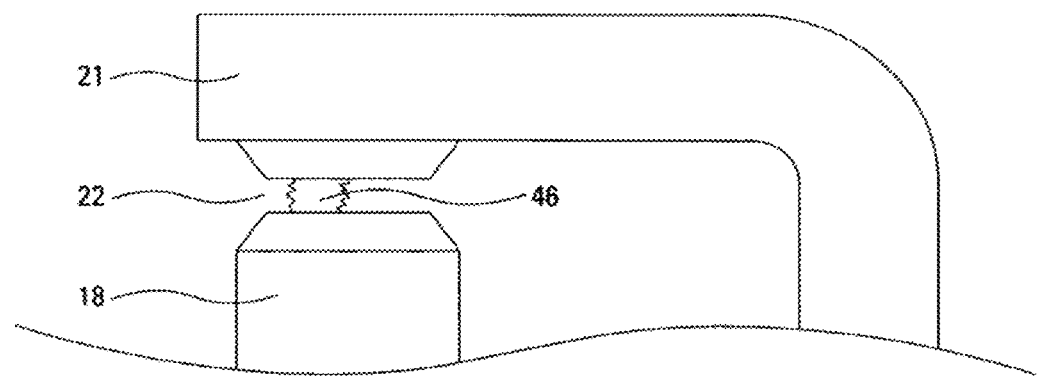
FIG. 14 is an enlarged side view of a first electrode and a second electrode in the form of a J-gap structure which illustrates conventional flame growth subsequent to the flame growth shown in FIG. 13 resulting from conventional flow fields having conventional flow field forces in the electrode gap.
Figure 15:
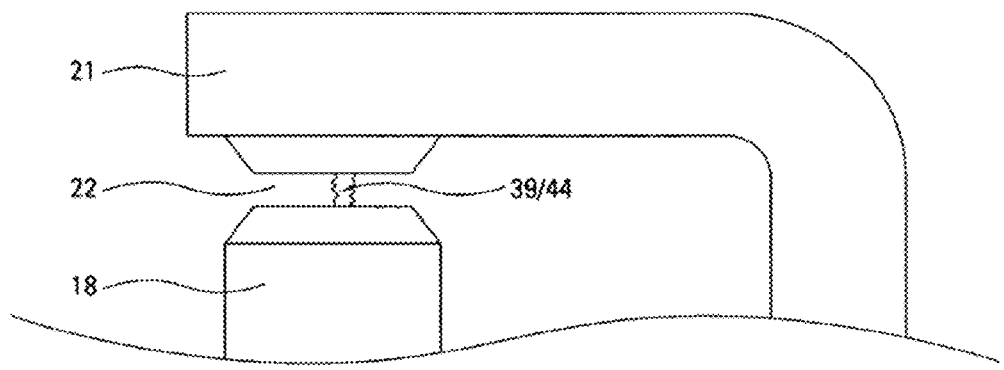
FIG. 15 is an enlarged side view of a first electrode and a second electrode in the form of a J-gap structure which illustrates inventive initial flame growth resulting from the inventive flow fields having inventive flow field forces in the electrode gap as shown in FIGS. 10 and 11.
Figure 16:
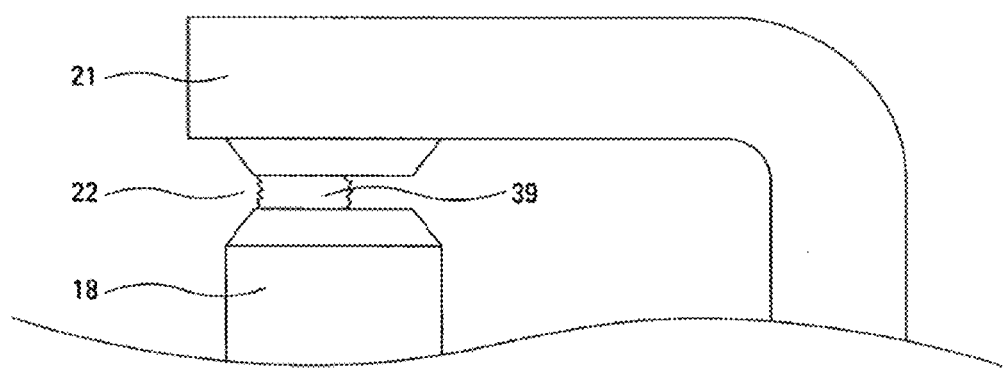
FIG. 16 is an enlarged side view of a first electrode and a second electrode in the form of a J-gap structure which illustrates inventive flame growth subsequent to the initial flame growth shown in FIG. 15 showing movement of the flame kernel within the electrode gap resulting from the inventive flow fields having inventive flow field forces in the electrode gap as shown in FIGS. 10 and 11.
Figure 17:
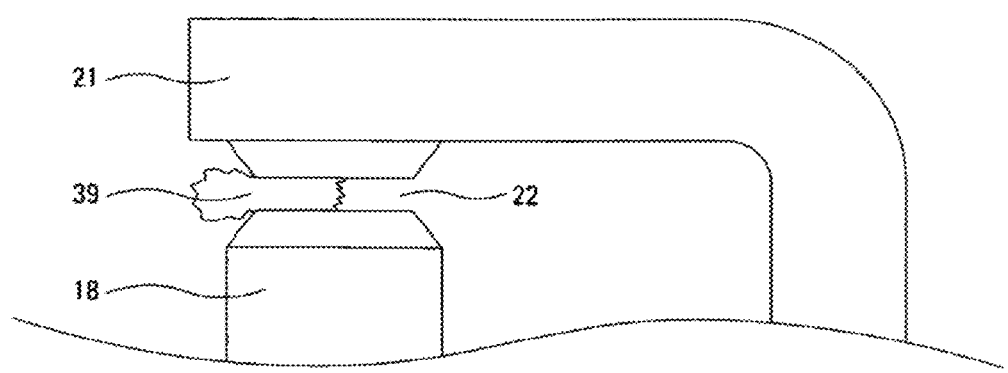
FIG. 17 is an enlarged side view of a first electrode and a second electrode in the form of a J-gap structure which illustrates inventive flame growth subsequent to the flame growth shown in FIG. 16 showing movement of the flame kernel within the electrode gap resulting from the inventive flow fields having inventive flow field forces in the electrode gap as shown in FIGS. 10 and 11.

Now referring to FIGS. 12 through 14 and 15 through 17, which shows conventional flame growth (46) (as shown in the examples of FIGS. 12 through 14) upon ignition of the fuel-oxidizer mixture (9) of a conventional flow field (45) (as shown in the example of FIG. 9) in relation to a J-gap electrode (18)(21) as compared to inventive flame growth (39) (as shown in the examples of FIGS. 15 through 17) upon ignition of the same fuel-oxidizer mixture (9) in the inventive flow field (14) (as shown in the example of FIG. 10) in relation to a similarly configured J-gap electrode (18)(21).

Now comparing FIGS. 12 and 15, ignition and initial conventional flame growth (46) (as shown in the example of FIG. 12) of the fuel-oxidizer mixture (9) in a conventional flow field (45) (as shown in the example of FIG. 9) and the ignition and initial inventive flame growth (39) (as shown in the example of FIG. 15) of the fuel-oxidizer mixture (9) in the inventive flow field (14) (as shown in the example of FIG. 10) can be similar as to certain embodiments, or as to other embodiments the ignition spark or the initial flame kernel (44) can be substantially moved by the inventive flow field forces (49) as compared to these same occurrences as to conventional flow field forces (47).

Now comparing FIGS. 13 and 16, the subsequent development of the inventive flame growth (39) (as shown in the example of FIG. 16) resulting from the combustion of the fuel-oxidizer mixture (9) of inventive flow field (14) (as shown in the example of 10) as to certain embodiments can occur at an increased rate as compared to the conventional flame growth (46) (as shown in the example of FIG. 13) resulting from the combustion of the fuel-oxidizer mixture (9) of the conventional flow field (45) (as shown by comparing the examples of FIGS. 13 and 16). Additionally, or in combination with the increased rate of flame growth (39), the flame growth (39) resulting from the combustion of the fuel-oxidizer mixture (9) of the inventive flow field (14) can be moved in the direction of the inventive flow field (14) to a greater degree than occurs in the conventional flow field (45) (as shown by comparing the examples of FIGS. 13 and 16).

Now comparing FIGS. 14 and 17, the substantially increased development of flame growth (39) (as shown in the example of FIG. 17) resulting from the combustion of the fuel-oxidizer mixture (9) of inventive flow field (14) (as shown in the example of FIG. 10) as to certain embodiments can move outward from the electrode gap (22) in a substantially lesser period of time as compared to the conventional flame growth (46) (as shown in the example of FIG. 14) resulting from the combustion of the fuel-oxidizer mixture (9) of the conventional flow field (45) (as shown in the example of FIG. 9). The subsequent rate of flame growth (39) inside the inventive pre-combustion chamber (13) can continue to be greater than in conventional pre-chamber spark plugs.

Now referring primarily to FIGS. 18 through 24, each of which provides an example of a configuration of a first electrode (18) and a second electrode (21) at the firing end (53) of a spark plug which can be utilized with embodiments of a pre-combustion chamber unit (2) in accordance with the invention; however, the invention is not limited to the electrode configurations shown in FIGS. 18 through 24 which provide a sufficient number of examples for the person for ordinary skill to make and use the invention with a numerous and wide variety of other electrode configurations.

Embodiments can include a spark plug including a pre-combustion chamber (13) which, upon installation of said spark plug, has fluid communication with the main combustion chamber (3) of an engine (1) via one or more induction ports (31), and wherein at least two electrodes (18)(21) are disposed within said pre-combustion chamber (3) which define an electrode gap (22) between them, characterized in that at least one induction port (31) has a configuration so that flow of fuel-oxidizer mixture through said at least one induction port (31) into said pre-combustion chamber reduces velocity of a flame growth (39) (or a growing flame) formed after ignition through a spark bridging the electrode gap (22) towards and approaching an internal surface (30) of said pre-combustion chamber.

FIG. 18 depicts the firing end (53) of a dual-bar spark plug electrode gap (as also shown in the examples of FIGS. 2-7). The dual-bar spark plug electrode structure (54) is typically used in natural gas engines (1) which burn bio-fuels such as landfill gas and digester gas. These fuels typically have low energy content and therefore can be susceptible to quenching during initial flame development. Relatively small electrode gap surface area, such as provided by the dual-bar configuration, can be advantageous for these applications.

FIG. 19 depicts the firing end (53) of a conventional J-gap spark plug electrode structure (55) (as also shown in the examples of FIGS. 8-17).

Figure 20:
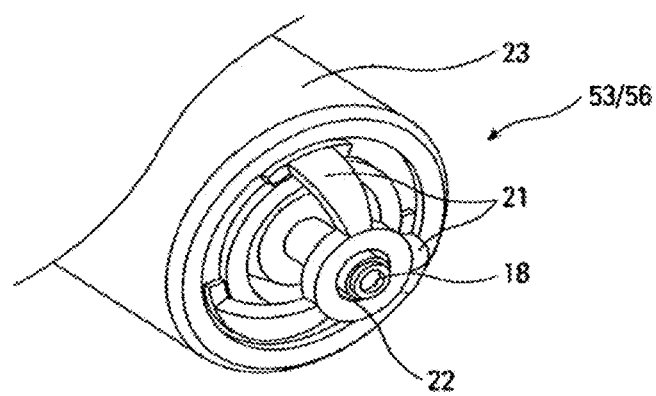
FIG. 20 is an enlarged end view which shows a first electrode in the form of a central electrode and a second electrode in the form of an annular ring.

FIG. 20 depicts the firing end (53) of an annular spark plug electrode structure (56). This type of electrode gap (22) is typically used in natural gas engines requiring extended spark plug durability. The electrode gap surface area is significantly larger than that of the dual-bar and J-gap spark plug electrode structure (55).

Figure 21:
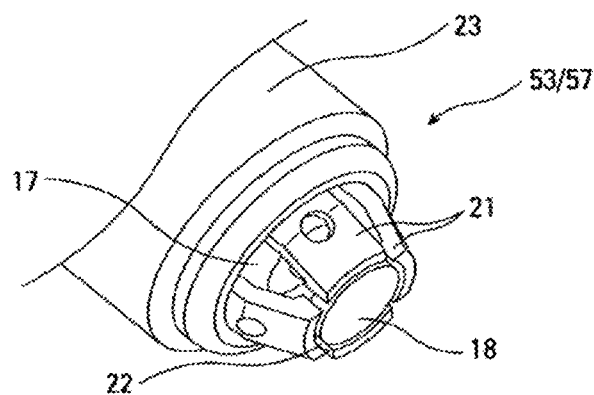
FIG. 21 is an enlarged end view which shows a first electrode in the form of a massive central electrode and a second electrode in the form of a four prong structure.

FIG. 21 depicts the firing end (53) of a massive-round spark plug electrode structure (57). This type of electrode gap (22) is typically used in natural gas engines requiring relatively long spark plug durability. The electrode gap surface area can be larger than that of the annular spark plug electrode gap (56).

Figure 22:
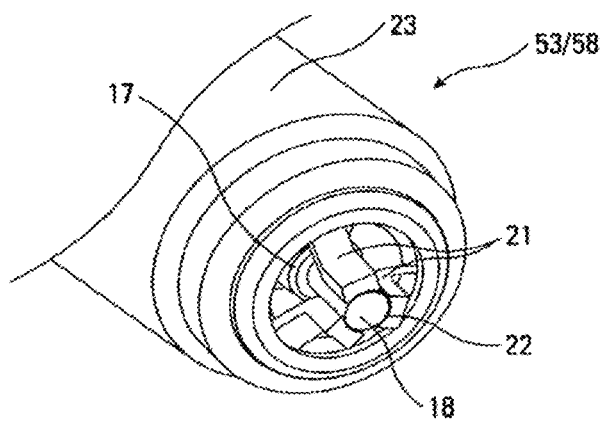
FIG. 22 is an enlarged end view which shows a first electrode in the form of a central electrode and a second electrode in the form of a three prong structure.

FIG. 22 depicts the firing end (53) of a three-prong spark plug electrode structure (58). This type of electrode gap (22) can be used in natural gas engines operating at relatively lower engine power densities.

Figure 23:
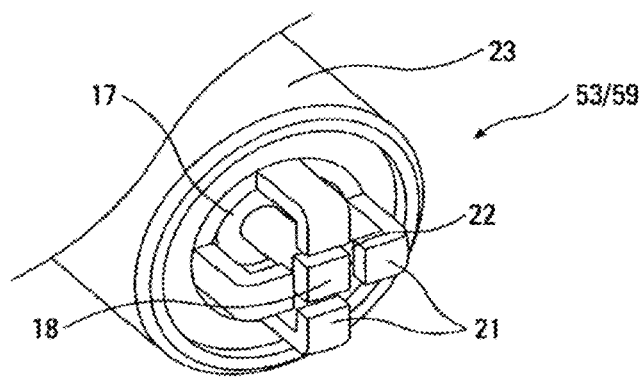
FIG. 23 is an enlarged end view which shows a first electrode in the form of a massive square central electrode and a second electrode in the form of a four prong structure.

FIG. 23 depicts the firing end of a massive-square spark plug electrode structure (59). This type of electrode gap (22) is used in natural gas engines operating at relatively higher engine power densities.

Figure 24:
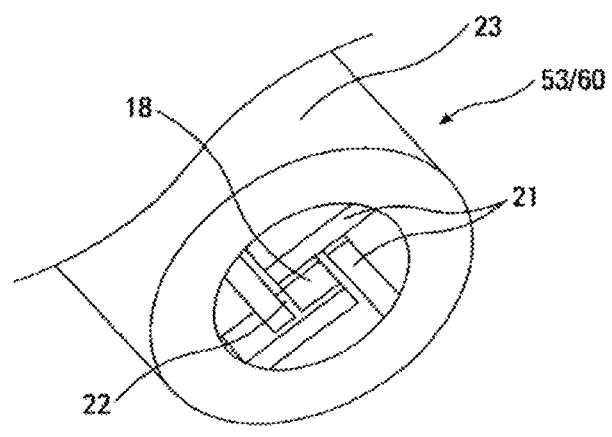
FIG. 24 is an enlarged end view which shows a first electrode in the form of a square central electrode and a second electrode in the form of a four bar structure.

FIG. 24 depicts the firing end (53) of a 4-blade spark plug electrode structure (60). This type of electrode gap (22) can be used in natural gas engines operating at relatively higher engine power densities. Unlike with the massive type of electrode gaps, the blade type of electrode gap can be designed to reduce the aerodynamic obstruction of the electrodes.

Now referring to FIGS. 25 through 38 which provide working examples of particular embodiments of the invention which achieve the ricochet effect and exhibit the above-described advantages of achieving the ricochet effect; however, it is not intended that the working examples be limiting but rather sufficient along with the description and Figures provided herein for a person of ordinary skill in the art to make and use a numerous and wide variety of embodiments of pre-combustion chamber units (2) in accordance with the invention.

Example 1. Dual Bar-Dual Electrode Gap

Now referring primarily to FIGS. 25 through 29, which provides a working example of a particular embodiment of the inventive pre-chamber unit (2) having a first electrode (18) in the form a central electrode (63) and a second electrode (21) in the form of a grounded dual bar electrode (54) (as shown in the example of FIG. 18) in the form of a first bar (61) and a second bar (62) disposed a distance apart with the first electrode (18) in the form of a central electrode (63) having a location between the first bar (61) and the second bar (62) to provide a dual electrode gap (as shown in the example of FIG. 18 and the examples of FIGS. 2 through 7). A central insulator (17) surrounds the central electrode (63). A metallic shell (23) encases the central electrode (63) and extends outwardly to provide a pre-combustion chamber (13) having a generally cylindrical shell external surface (24) and generally cylindrical shell pre-combustion chamber internal surface (30) surrounding the central insulator (17) and the first electrode (18) and the second electrode (21). The pre-combustion chamber (13) having a generally flat pre-combustion chamber top (64) (as shown in the examples of FIGS. 25 through 29). A pre-combustion chamber inner diameter (65) can be provided in the range of about 9 mm and about 13 mm (as shown in the example of FIG. 29). The pre-combustion chamber (13) can have an insertion depth (66)(that portion of the external surface (28) extending into the main combustion chamber (3)) of between about 6 mm and about 8 mm (as shown in the example of FIG. 29).

The relationship of the internal surface (30) of the pre-combustion chamber (13) can enclose a total volume (67) of between about 800 mm$^3$ and about 1000 mm$^3$ (as shown in the example of FIG. 25). The configuration of the pre-combustion chamber (13) forward of the electrode gap (22) can enclose a first pre-combustion chamber volume (68) of between about 350 mm$^3$ and about 450 mm$^3$ (as shown in the example of FIG. 26). The first pre-combustion chamber volume (68) can be adjusted, for example, by increasing or decreasing the pre-combustion chamber inner diameter (65) of the cylindrical internal surface (30) defining the first pre-combustion chamber volume (68). The configuration of the pre-combustion chamber (13) rearward of the electrode gap (22) can enclose a second pre-combustion chamber volume (69) of between about 450 mm$^3$ and about 550 mm$^3$ (as shown in the example of FIG. 27). The second pre-combustion chamber volume (69) can be adjusted, for example, by increasing or decreasing the pre-combustion chamber inner diameter (65) of cylindrical internal surface (30) defining the second pre-combustion chamber volume (69). The example of FIGS. 25-29, having a first pre-chamber volume (68) defined by a greater diameter of the internal surface (30) of pre-combustion chamber (13) and having a second pre-chamber volume (69) defined by a lesser diameter of the internal surface (30) of the pre-combustion chamber (13), respectively. The height (70) of the first pre-combustion chamber volume (68) can be in the range of about 3 mm to about 5 mm (as shown in the example of FIG. 29).

The pre-combustion chamber (13) whether formed by extension of the shell (23) or by coupling of a pre-combustion chamber element (26) to the base of the shell (23), or otherwise, can have an axial induction port (32) substantially axially aligned with the central longitudinal axis (33) of the pre-chamber unit (2) (as shown in the example of FIG. 29). The axial induction port (32) can have a length (71) along the longitudinal axis (33) between the external surface (28) and the internal surface (30) of the pre-combustion chamber (13) in the range of about 2 mm to about 4 mm (being the thickness of the pre-combustion chamber wall (27)) (as shown in the example of FIG. 29). The axial induction port (32) can have a diameter (72) of between about 1 millimeter and about 2 millimeters (as shown in the example of FIG. 29).

Now referring primarily to FIG. 28, each of the side induction ports (34) can have a diameter (72) in the range of about 1 mm and about 2 millimeters ("mm") (as shown in the example of FIG. 28). Each side induction port (34) can have an external port aperture (73) located radially outward from the axial induction port (32) at a first radius (75) of between about 5 mm and about 7 mm (as shown in the example of FIG. 28). Each of the side induction ports (34) can communicate between the external surface (28) and the internal surface (30) of the pre-combustion chamber wall (27) inwardly at a side induction port angle (78) in the range of about 20 degrees and about 30 degrees (as shown in the example of FIG. 28) to correspondingly locate an internal port aperture (74) on the internal surface (30) of the pre-combustion chamber (13) (as shown in the example of FIG. 28).

Example 2. J-Gap Electrode

Now referring primarily to FIGS. 30 through 38, which provides a working example of particular embodiment of the inventive pre-chamber unit (2) having a first electrode (18) in the form a central electrode (63) and a second electrode (21) in the form of a grounded J-electrode (also shown in the example of FIGS. 19 and 10-11 and 15-17) disposed a distance axially above the central electrode (63) to provide an electrode gap (22) (as shown in the example of FIG. 30). A central insulator (17) surrounds the central electrode (63). A metallic shell (23) encases the central electrode (63) and extends outwardly to provide a pre-combustion chamber (13) having a generally cylindrical shell external surface (24) and generally cylindrical internal surface (30) surrounding the central insulator (17) and the first electrode (18) and the second electrode (21). The substantially closed end of the cylindrical pre-combustion chamber (13) having a flat pre-combustion chamber top (64) (as shown in the examples of 30-38). The pre-combustion chamber inner diameter (65) can be provided in the range of about 9 mm and about 13 mm (as shown in the example of FIG. 34). The pre-combustion chamber (13) can have an insertion depth (66) (that portion extending into the main combustion chamber (3)) of between about 3 mm and about 5 mm (as shown in the example of FIG. 34).

The relationship of the internal surface (30) of the pre-combustion chamber (13) can enclose a total volume (67) of between about 800 mm$^3$ and about 1000 mm$^3$ (as shown in the example of FIG. 30). The configuration of the pre-combustion chamber (13) forward of the electrode gap (22) can enclose a first pre-combustion chamber volume (68) of between about 550 mm$^3$ and about 650 mm$^3$ (as shown in the example of FIG. 31). The first pre-combustion chamber volume (68) can be adjusted, for example, by increasing or decreasing the pre-combustion chamber inner diameter (65) of the cylindrical internal surface defining the first pre-combustion chamber volume (68). The configuration of the pre-combustion chamber (13) rearward of the electrode gap (22) can enclose a second pre-combustion chamber volume (69) of between about 250 mm$^3$ and about 350 mm$^3$ (as shown in the example of FIG. 32). The second pre-combustion chamber volume (69) can be adjusted, for example, by increasing or decreasing the pre-combustion chamber inner diameter (65) of cylindrical internal surface defining the second pre-combustion chamber volume (69). The example of FIGS. 30 through 38, having a first pre-chamber volume (68) defined by a greater diameter of the internal surface of pre-combustion chamber (13) and having a second pre-chamber volume (69) defined by a lesser diameter of the internal surface (30) of the pre-combustion chamber (13), respectively. The height (70) of the first pre-combustion chamber volume (68) measured from about the electrode top (48) of the central electrode (63) to the inner surface of the pre-combustion chamber top (64) can be in the range of about 6 mm to about 8 mm (as shown in the example of FIG. 34).

The pre-combustion chamber (13) whether formed by extension of the shell (23) or by coupling of a pre-combustion chamber element (26) to the base of the shell (23), or otherwise, can have an axial induction port (32) substantially axially aligned with the central longitudinal axis (33) of the pre-chamber unit (2)(as shown in the example of FIG. 34). The axial induction port (32) can have a length (71) along the longitudinal axis (33) between the external surface (28) and the internal surface (30) of the pre-combustion chamber top (64) in the range of about 2 mm to about 4 mm (being the thickness of the pre-combustion chamber wall (27))(as shown in the example FIG. 34). The axial induction port (32) can have a diameter (72) of between about 1 millimeter and about 2 millimeters ("mm") (as shown in the example of FIG. 33).

As shown in FIG. 33, the pre-combustion chamber (13) can include between six and eight side induction ports (34) located radially outward of and generally equally radially spaced about the axial induction port (32). The side induction ports (34) can comprise a first set (51) of between three and four side induction ports (34) and second set (52) of between three and four side induction ports (34), each of the first and second set (51)(52) can have a different structure.

Now referring primarily to FIGS. 35 and 36, each of the first set (51) of side induction ports (34) can have a diameter

(72) in the range of about 1 mm and about 2 millimeters ("mm") (as shown in the example of FIG. 33). Each of the first set (51) of side induction ports (34) can have an external port aperture (73) located radially outward from the central longitudinal axis (33) at a first radius (75) of between about 6 mm and about 8 mm (as shown in the example of FIG. 36). Each of the first set (51) of side induction ports (34) can have a swirl offset (77) of between 3 mm to 4 mm which defines the perpendicular distance between the side induction port central axis (76) and the central longitudinal axis (33) of the inventive pre-chamber unit (as shown in the example of FIG. 35). Each of the first set (51) of side induction ports (34) can communicate between the external surface (28) and the internal surface (30) of the pre-combustion chamber wall (27) inwardly at a side induction port angle (78) in the range of about 25 degrees to about 35 degrees (as shown in the example of FIG. 36). The external port aperture (73) of each of the first set (51) of side induction ports (34) could be spaced equally and with a single side induction port (34) being located at a first index angle (79) of about 30 degrees to about 40 degrees from the ground strap electrode (21) reference location (80) (as shown in the example of FIG. 35).

Now referring primarily to FIGS. 37 and 38, each of the second set (52) of side induction ports (34) can have a diameter (72) in the range of about 1 mm and about 2 millimeters ("mm") (as shown in the example of FIG. 33). Each of the second set (52) of side induction ports (34) can have an external port aperture (73) located radially outward from the central longitudinal axis (33) at a second radius (81) of between about 7 mm and about 9 mm (as shown in the example of FIG. 38). Each of the second set (52) of side induction ports (34) can have a second swirl offset (83) of between 1 mm to 2 mm which defines the perpendicular distance between the side induction port central axis (82) and the central longitudinal axis (33) of the inventive pre-chamber unit (as shown in the example of FIG. 37). Each of the second set (52) of side induction ports (34) can communicate between the external surface (28) and the internal surface (30) of the pre-combustion chamber wall (27) inwardly at a second side induction port angle (84) in the range of about 50 degrees to about 60 degrees (as shown in the example of FIG. 38). The external port aperture (73) of each of the second set (52) of side induction ports (34) could be spaced equally and with a single side induction port (34) being located at a second index angle (85) of about 80 degrees to about 100 degrees from the ground strap electrode (21) reference location (80) (as shown in the example of FIG. 37).

In certain embodiments, the design of the prechamber may be matched to the design of the spark plug electrode gap. In certain embodiments, the matching may take place by calculating the flow fields at the gap and within the prechamber and the resulting effects on flame quenching, rate of combustion and the electrodes wear rate. The term "matching" may mean that the geometry of the prechamber, in terms of all its parameters such as volume, aspect ratio, holes' diameter, penetration angle, rotational offset and so on, may be arranged with the use of Computational Fluid Dynamics (CFD) to create the most advantageous flow field and lambda distribution at the gap and within the prechamber. In certain embodiments, the term "most advantageous" may include one or more of the following characteristics:

The flow velocity in the gap may be substantially uniform in magnitude and direction.
The magnitude of the flow in the gap may be less than about 50 m/s.
The flow from the gap may be directed away from quenching surfaces and towards the prechamber exit orifices (holes).
The flow in the prechamber may have an average turbulent kinetic energy greater than about 1 $m^2/s^2$.
The lambda distribution in the gap may be substantially uniform.
The magnitude of lambda in the gap may be richer than about 2.5.
The lambda distribution in the prechamber may be richer in the region comprised between the gap and the exit orifices and leaner in the region comprised between the gap and the bottom of the prechamber.
The magnitude of the average lambda in the prechamber may be richer than about 2.5.

In certain embodiments, FIG. 39 shows the uniform flow velocity and magnitude in the gap 3903 of a permanent passive prechamber 3901 with removable spark plug 3902. It also shows that the flow from the gap may be directed away from quenching surfaces and towards the prechamber exit orifices/holes 3904.

In certain embodiments, FIG. 40 shows uniform Lambda distribution 4002 in the gap of a permanent passive prechamber with a removable spark plug. It also shows Lambda stratification in the prechamber that is richer 4003 in the region comprised between the gap and the exit orifices and leaner 4001 in the region comprised between the gap and the bottom of the prechamber.

In certain embodiments, the spark plug and prechamber may be matched to the quality of the fuel. In certain embodiments, the aspect of matching the combination of spark plug design and forward flow prechamber design to the fuel quality defined as energy content (LHV) and propensity to knock (MN) is shown in FIG. 41. In certain embodiments, the matching may take place by calculating the flow fields at the gap and within the prechamber and the resulting effects on flame quenching, rate of combustion and electrodes wear rate. In certain embodiments, FIG. 41 shows a correlation between the type of fuel, the Low Heating Value (LHV) and the fuel Methane Number (MN).

In certain embodiments, the term "matching" may mean that the geometry of the prechamber, in terms of all its parameters such as volume, aspect ratio, holes' diameter, penetration angle, rotational offset and so on, is arranged with the use of CFD to create the most advantageous flow field and lambda distribution at the gap and within the prechamber. The term "most advantageous" may include one or more of the following characteristics:

The flow velocity in the gap may be uniform in magnitude and direction.
The magnitude of the flow in the gap may be less than about 50 m/s.
The flow from the gap may be directed away from quenching surfaces and towards the prechamber exit orifices (holes).
The flow in the prechamber may have an average turbulent kinetic energy greater than about 1 $m^2/s^2$.
The lambda distribution in the gap may be uniform.
The magnitude of lambda in the gap may be richer than about 2.5.
The lambda distribution in the prechamber may be richer in the region between the gap and the exit orifices and leaner in the region between the gap and the bottom of the prechamber.
The magnitude of the average lambda in the prechamber may be richer than about 2.5.

For fuels with energy content greater than about 800 BTU/ft³, the total volume of the prechamber may be in the range of about 1000-6000 mm³ as shown in FIG. 42.

For fuels with energy content lower than about 800 BTU/ft³, the total volume of the prechamber should be greater than about 1000 mm³ as shown in FIG. 43.

For fuels with Methane Number (MN) greater than about 60, the total volume of the prechamber may be in the range of about 1000-6000 mm³ as shown in FIG. 44.

In certain embodiments, FIG. 42 shows a permanent passive prechamber 4201 with removable spark plug 4202 for natural gas fueled engines with medium pre-chamber volume 4203 as compared to general configurations for the other types of fuels.

In certain embodiments, FIG. 43 shows a permanent passive prechamber 4301 with removable spark plug 4302 for low BTU fueled engines as with largest pre-chamber volume 4303 compared to general configurations for the other types of fuels.

In certain embodiments, FIG. 44 shows a permanent passive prechamber 4401 with removable spark plug 4402 for greater than about 60 MN fueled engines with a medium prechamber volume 4403 as compared to general configurations for the other types of fuels.

In certain embodiments, FIG. 45 shows a permanent passive prechamber 4501 with removable spark plug 4502 for low MN fueled engines with a smallest pre-chamber volume 4503 as compared to general configurations for the other types of fuels.

In certain embodiments, FIG. 46 shows uniform flow velocity and magnitude in the gap of a forward flow prechamber spark plug 4602. It also shows that the flow from the gap 4601 may be directed away from quenching surfaces and towards the prechamber exit orifices (holes).

In certain embodiments, FIG. 47 shows uniform Lambda distribution in the gap 4702 of a forward flow prechamber spark plug. It also shows Lambda stratification in the prechamber that is richer 4703 in the region between the gap and the exit orifices and leaner 4701 in the region comprised between the gap and the bottom of the prechamber.

In certain embodiments, the thermal dissipation characteristics of a selected combination of spark plug design and forward flow prechamber design may be optimized. The optimization may be determined by calculating the temperatures of the various elements defining the combination and the resulting effects on flame quenching, rate of combustion and the electrodes wear rate. In certain embodiments, the term "matching" may mean that the geometry of the prechamber, in terms of all its parameters such as volume, aspect ratio, holes' diameter, penetration angle, rotational offset and so on, may be arranged with the combined use of CFD and thermal finite element analysis (FEA) to create the most advantageous flow field and lambda distribution at the gap and within the prechamber while achieving optimum surface temperatures of the various elements constituting the spark plug and the prechamber. The term "most advantageous" may include one or more of the following characteristics:

The flow velocity in the gap may be uniform in magnitude and direction.

The magnitude of the flow in the gap may be less than about 50 m/s.

The flow from the gap may be directed away from quenching surfaces and towards the prechamber exit orifices (holes).

The flow in the prechamber may have an average turbulent kinetic energy greater than about 1 m²/s².

The lambda distribution in the gap may be uniform.

The magnitude of lambda in the gap may be richer than about 2.5.

The lambda distribution in the prechamber may be richer in the region comprised between the gap and the exit orifices and leaner in the region comprised between the gap and the bottom of the prechamber.

The magnitude of the average lambda in the prechamber may be richer than about 2.5.

The inner walls of the prechamber may not exceed 900 C.

The ground electrode temperature may not exceed 900 C.

The center electrode temperature may not exceed 900 C.

The spark plug core nose temperature may not exceed 800 C.

The spark plug hot lock temperature may not exceed 300 C.

The spark plug roll over temperature may not exceed 300 C.

The prechamber end-cap temperature may not exceed 1000 C.

In certain embodiments, FIG. 48 shows a temperature distribution in the major elements of a forward flow prechamber spark plug. Various temperatures may be achieved depending on the material used and type of construction. In certain embodiments, FIG. 48 shows ground electrode temperature 4801; center electrode temperature 4802; prechamber inner-wall temperature 4803; and prechamber outer-wall temperature 4804.

In certain embodiments, FIG. 49 shows a temperature distribution in the major elements of a removable spark plug and permanent prechamber. Various temperatures can be achieved depending on the material used and type of construction. In certain embodiments, FIG. 49 shows ground electrode temperature 4901; center electrode temperature 4902; prechamber inner-wall temperature 4903; and prechamber outer-wall temperature 4904.

In certain embodiments, all the prechamber geometrical parameters may be arranged with the combined use of CFD and thermal FEA to create the most advantageous flow field and lambda distribution at the gap and within the prechamber, while achieving optimum surface temperatures. Below are some CFD and FEA examples.

In certain embodiments, FIG. 50 shows an active scavenge prechamber spark plug with a scavenging port 5002 located remotely from the radial gap 5001. In certain embodiments, FIG. 51 shows an active scavenge prechamber spark plug with a scavenging port 5102 located adjacent to the radial gap 5101. In certain embodiments, FIG. 52 shows a flow velocity pattern 5202 and uniform magnitude in a single radial gap 5201 of an active scavenge prechamber spark plug. It also shows that the uniform flow from the gap 5201 is directed away from quenching surfaces and towards the prechamber exit orifices/holes 5203. In certain embodiments, FIG. 53 shows uniform flow velocity and magnitude 5301 in a single radial gap of an active scavenge prechamber spark plug. In certain embodiments, FIG. 54 shows Lambda stratification in a prechamber that is richer in the region 5402 comprised between the gap and the exit orifices and leaner in the region 5401 between the gap and the bottom of the prechamber. In certain embodiments, FIG. 55 shows the uniform Lambda distribution 5501 in the single radial gap. In certain embodiments, FIG. 56 shows a temperature distribution in the major elements of an active scavenge prechamber spark plug with single radial gap. Various temperatures can be achieved depending on the material used and type of construction. FIG. 56 shows pre-chamber spark plug 5603; center electrode 5602; ground electrode 5601; and pre-chamber volume 5604.

In certain embodiments, a large electrode surface may be defined as larger than about 2 mm$^2$. For electrode surfaces greater than about 2 mm$^2$, it may be very difficult to achieve uniform flow velocities and lambda distributions. For example, an electrode surface of about 9 mm$^2$ may be used. With such a large electrode surface, the spark plug life may be greatly enhanced. This advantage may be achieved without substantial penalty to the ignitability performance, which may be assured by the uniform flow velocities and lambda distributions as described above. In order to achieve these conditions, the geometrical parameters of the pre-chamber may be arranged with the use of CFD and thermal FEA to create the most advantageous flow field and lambda distribution at the gap and within the prechamber while achieving optimum surface temperatures of the various elements constituting the spark plug and the prechamber. The ranges and criteria pertaining to flow fields, lambda distributions and temperatures may be the same as provided above. In certain embodiments, FIG. 57 shows a removable spark plug 5701 with radial gap 5703, screwed into a pre-chamber 5702.

As can be easily understood from the foregoing, the basic concepts of the present invention may be embodied in a variety of ways. The invention involves numerous and varied embodiments of an inventive passive chamber spark plug including devices and methods for using such devices including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "spark" should be understood to encompass disclosure of the act of "sparking"—whether explicitly discussed or not—and, conversely, were there effectively disclosure of the act of "sparking", such a disclosure should be understood to encompass disclosure of a "spark" and even a "means for sparking." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the pre-chamber units or pre-chamber spark plugs herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method of distributing a fuel-oxidizer mixture in a pre-combustion chamber, comprising:
    providing a pre-combustion chamber comprising:
        a primary electrode and one or more ground electrodes disposed within the pre-combustion chamber, the primary electrode and the ground electrode disposed a distance apart to provide one or more electrode gaps;
        at least one induction port which communicates between an external surface and an internal surface of said pre-combustion chamber; and
    directing a fuel-oxidizer mixture into the pre-combustion chamber via the at least one induction port to reduce interaction of a flame kernel with an internal surface of said pre-combustion chamber;
    wherein the volume of the pre-combustion chamber is between about 1000 mm$^3$ and about 6000 mm$^3$ for use with fuels with energy content greater than about 800 BTU/ft$^3$.

2. The method of claim 1, wherein the ground electrodes comprise a single ground electrode disposed a distance apart from the primary electrode to form a single electrode gap.

3. The method of claim 2, wherein the single ground electrode has a surface area greater than about 1 mm$^2$.

4. The method of claim 2, wherein the pre-combustion chamber is configured to generate a flow velocity in the single electrode gap of the spark plug that is less than about 100 m/s when a fuel air mixture is ignited in the pre-combustion chamber.

5. The method of claim 1, wherein the pre-combustion chamber is configured to generate an average turbulent kinetic energy greater than 1 m$^2$/s$^2$ when a fuel air mixture is ignited in the pre-combustion chamber.

6. The method of claim 2, wherein the pre-combustion chamber is configured to generate a substantially uniform lambda distribution in the single electrode gap of the spark plug when a fuel air mixture is ignited in the pre-combustion chamber.

7. The method of claim 2, wherein the pre-combustion chamber is configured to generate a lambda fuel air mixture richer than about 2.5 in the single electrode gap of the spark plug when a fuel air mixture is ignited in the pre-combustion chamber.

8. The method of claim 1, wherein the pre-combustion chamber is configured to generate an average lambda value richer than about 2.5 in the pre-combustion chamber when a fuel air mixture is ignited in the pre-combustion chamber.

9. The method of claim 1, wherein the pre-combustion chamber has a total volume less than about 6000 mm$^3$ for use with fuels with Methane Number lower than about 60.

10. The method of claim 1, wherein the pre-combustion chamber has a total volume between about 1000 mm$^3$ and about 6000 mm$^3$ for use with fuels with Methane Number greater than about 60.

11. The method of distributing a fuel-oxidizer mixture in a pre-combustion chamber of claim 1, further comprising directing a fuel-oxidizer mixture into the pre-combustion chamber via the at least one induction port to increase a fuel-oxidizer mixture ratio within said pre-combustion chamber toward a center of said pre-combustion chamber.

12. The method of distributing a fuel-oxidizer mixture in a pre-combustion chamber of claim 1, further comprising directing a fuel-oxidizer mixture into the pre-combustion chamber via the at least one induction port to reduce quenching of said flame kernel on said internal surface of said pre-combustion chamber.

13. The method of distributing a fuel-oxidizer mixture in a pre-combustion chamber of claim 1, further comprising:
    surrounding a first of said one or more electrodes with a central insulator, said central insulator encased in a shell extending outwardly about said one or more electrodes; and
    generating flow field forces within said electrode gap sufficient to reduce interaction of said flame kernel with said central insulator.

14. The method of distributing a fuel-oxidizer mixture in a pre-combustion chamber of claim 1, further comprising generating a flow field velocity within said electrode gap of between about 1.0 meter per second and about 100.0 meters per second.

15. A method of distributing a fuel-oxidizer mixture in a pre-combustion chamber, comprising
    providing a pre-combustion chamber comprising:
        a primary electrode and a ground electrode disposed within the pre-combustion chamber, the primary electrode and the ground electrode disposed a distance radially apart to provide a single electrode gap;
        at least one induction port which communicates between an external surface and an internal surface of said pre-combustion chamber; the at least one induction port configured to aim at least one infilling stream of said fuel-oxidizer mixture at said internal surface of said pre-combustion chamber; and
    introducing at least one infilling stream of fuel-oxidizer mixture into the pre-combustion chamber via the at least one induction port;
    wherein the at least one induction port is configured to develop flow field forces which increase mixing of an amount of residual gases within said pre-combustion chamber with said in-filling streams to reduce temperature of said internal surface of said pre-chamber or the amount of residual gases.

16. The method of claim 15, wherein the ground electrode comprises an electrode surface area greater than about 1 mm$^2$.

17. The method of claim 15, wherein the pre-combustion chamber is configured to generate a flow velocity in the single electrode gap of the spark plug that is less than about 100 m/s when a fuel air mixture is ignited in the pre-combustion chamber.

18. The method of claim 15, wherein the pre-combustion chamber is configured to generate an average turbulent kinetic energy greater than 1 $m^2/s^2$ when a fuel air mixture is ignited in the pre-combustion chamber.

19. The method of claim 15, wherein the pre-combustion chamber is configured to generate a substantially uniform lambda distribution in the single electrode gap of the spark plug when a fuel air mixture is ignited in the pre-combustion chamber.

20. The method of claim 15, wherein the pre-combustion chamber is configured to generate a lambda fuel air mixture richer than about 2.5 in the single electrode gap of the spark plug when a fuel air mixture is ignited in the pre-combustion chamber.

21. The method of claim 15, wherein the pre-combustion chamber is configured to generate a lambda fuel air mixture richer than in a second region between the single electrode gap of the spark plug and a bottom surface of the pre-combustion chamber when a fuel air mixture is ignited in the pre-combustion chamber.

22. The method of claim 15, wherein the pre-combustion chamber is configured to generate an average lambda value richer than about 2.5 in the pre-combustion chamber when a fuel air mixture is ignited in the pre-combustion chamber.

23. The method of claim 15, wherein the volume of the pre-combustion chamber is between about 1000 $mm^3$ and about 6000 $mm^3$ for use with fuels with energy content greater than about 800 $BTU/ft^3$.

24. The method of claim 15, wherein the pre-combustion chamber has a total volume greater than about 1000 $mm^3$ for use with fuels with energy content less than about 800 $BTU/ft^3$.

25. The method of claim 15, wherein the pre-combustion chamber has a total volume less than about 6000 $mm^3$ for use with fuels with Methane Number lower than about 60.

26. The method of claim 15, wherein the pre-combustion chamber has a total volume between about 1000 $mm^3$ and about 6000 $mm^3$ for use with fuels with Methane Number greater than about 60.

27. The method of distributing a fuel-oxidizer mixture in a pre-combustion chamber of claim 15, further comprising configuring said at least one induction port to aim at least one infilling stream of said fuel-oxidizer mixture at least one point location on said internal surface of said pre-combustion chamber selected from the group consisting of: a core nose of a central insulator, an upper corner of said core nose of said central insulator, one or more electrodes, and said shell.

28. The method of distributing a fuel-oxidizer mixture in a pre-combustion chamber of claim 15, further comprising ricocheting said at least one infilling stream from said internal surface of said pre-combustion chamber to achieve reduced interaction of said flame kernel with said internal surface of said pre-combustion chamber.

29. A pre-chamber unit, comprising:
a primary electrode and a ground electrode disposed a distance radially apart to provide a single electrode gap;
a pre-combustion chamber which at least partially encloses said first electrode and said second electrode; and
at least one induction port which communicates between an external surface and an internal surface of said pre-combustion chamber, said at least one induction port configured to direct a fuel-oxidizer mixture into the pre-combustion chamber to generate flow field forces within said pre-combustion chamber which upon ignition of a fuel-oxidizer mixture reduce the interaction of a flame kernel with said internal surface of said pre-combustion chamber;
wherein the pre-combustion chamber has a total volume greater than about 1000 $mm^3$ for use with fuels with energy content less than about 800 $BTU/ft^3$.

30. The pre-chamber unit of claim 29, wherein the ground electrode comprise an electrode surface area greater than about 1 $mm^2$.

31. The pre-chamber unit of claim 29, wherein the pre-combustion chamber is configured to generate a flow velocity in the single electrode gap of the spark plug that is less than about 100 m/s when a fuel air mixture is ignited in the pre-combustion chamber.

32. The pre-chamber unit of claim 29, wherein the pre-combustion chamber is configured to generate an average turbulent kinetic energy greater than 1 $m^2/s^2$ when a fuel air mixture is ignited in the pre-combustion chamber.

33. The pre-chamber unit of claim 29, wherein the pre-combustion chamber is configured to generate a substantially uniform lambda distribution in the single electrode gap of the spark plug when a fuel air mixture is ignited in the pre-combustion chamber.

34. The pre-chamber unit of claim 29, wherein the pre-combustion chamber is configured to generate a lambda fuel air mixture richer than about 2.5 in the single electrode gap of the spark plug when a fuel air mixture is ignited in the pre-combustion chamber.

35. The pre-chamber unit of claim 29, wherein the pre-combustion chamber is configured to generate a lambda fuel air mixture richer than in a second region between the single electrode gap of the spark plug and a bottom surface of the pre-combustion chamber when a fuel air mixture is ignited in the pre-combustion chamber.

36. The pre-chamber unit of claim 29, wherein the pre-combustion chamber is configured to generate an average lambda value richer than about 2.5 in the pre-combustion chamber when a fuel air mixture is ignited in the pre-combustion chamber.

37. The pre-chamber unit of claim 29, wherein the pre-combustion chamber has a total volume less than about 6000 $mm^3$ for use with fuels with Methane Number lower than about 60.

38. The pre-chamber unit of claim 29, wherein the pre-combustion chamber has a total volume between about 1000 $mm^3$ and about 6000 $mm^3$ for use with fuels with Methane Number greater than about 60.

39. The pre-chamber unit of claim 29, wherein a flow field velocity within said electrode gap has a range of between about 1.0 m/s and about 100.0 m/s.

40. The pre-chamber unit of claim 29, wherein said at least one induction port is configured to aim at least one infilling stream toward a selected one or more of: a nose of a central insulator, an upper corner of a nose of a central insulator, a lower corner of a nose of a central insulator, a side surface of a nose of a central insulator, and a shell.

41. The pre-chamber unit of claim 29, wherein said internal surface comprises a central insulator from which said at least one infilling stream is configured to ricochet to generate said flow field forces to increase said fuel-oxidizer mixture ratio in said electrode gap.

42. The pre-chamber unit of claim 29, wherein said pre-combustion chamber encloses a total volume of between about 800 $millimeters^3$ and about 1000 $millimeters^3$.

43. The pre-chamber unit of claim 29, wherein the at least one induction port is configured to develop flow field forces which increase mixing of an amount of residual gases within said pre-combustion chamber with said in-filling streams to reduce temperature of said internal surface of said pre-chamber or said amount of residual gases.

\* \* \* \* \*